(12) United States Patent
Hosoya

(10) Patent No.: US 7,206,129 B2
(45) Date of Patent: Apr. 17, 2007

(54) REAL IMAGE TYPE ZOOM FINDER, AND IMAGING SYSTEM INCORPORATING THE SAME

(75) Inventor: Takeshi Hosoya, Hino (JP)

(73) Assignee: Olympus Corporation, Tokyo (JP)

( * ) Notice: Subject to any disclaimer, the term of this patent is extended or adjusted under 35 U.S.C. 154(b) by 163 days.

(21) Appl. No.: 10/947,486

(22) Filed: Sep. 23, 2004

(65) Prior Publication Data

US 2005/0068616 A1    Mar. 31, 2005

(30) Foreign Application Priority Data

Sep. 26, 2003    (JP) .............................. 2003-334567

(51) Int. Cl.
*G02B 23/00*    (2006.01)
(52) U.S. Cl. ...................... 359/431; 359/422; 359/432; 359/379; 359/380
(58) Field of Classification Search ................ 359/379, 359/380, 422, 432, 431
See application file for complete search history.

(56) References Cited

U.S. PATENT DOCUMENTS 6,671,461 B2    12/2003    Tochigi ....................... 396/379

2002/0034005 A1 *    3/2002    Kato .......................... 359/431
2003/0160902 A1 *    8/2003    Mihara et al. ............... 348/676

FOREIGN PATENT DOCUMENTS

| JP | 08-136806 | 5/1996 |
| JP | 10-319320 | 12/1998 |
| JP | 2000-347101 | 12/2000 |

* cited by examiner

*Primary Examiner*—Drew A. Dunn
*Assistant Examiner*—Joshua L. Pritchett
(74) *Attorney, Agent, or Firm*—Kenyon & Kenyon LLP

(57) ABSTRACT

A real image type zoom finder that, albeit being reduced in size and thickness, can gain high enough zoom ratios and an imaging system equipped with such a real image type zoom finder. The real image type zoom finder comprises an objective optical system, an image-erection optical system and an eyepiece optical system. The objective optical system comprises a negative first lens group, a positive second lens group, a negative third lens group and a positive fourth lens group. Upon zooming, the first lens group and the fourth lens group remain fixed, the second lens group moves toward the object side at the telephoto, not the wide-angle end, and the third lens group moves toward the image side at the telephoto, not the wide-angle end. The first lens group consists of one single lens of double-concave shape, and that single lens satisfies condition regarding a shape factor.

54 Claims, 7 Drawing Sheets

REAL IMAGE TYPE ZOOM FINDER, AND IMAGING SYSTEM INCORPORATING THE SAME

This application claims benefit of Japanese Application No. 2003-334567 filed in Japan on Sep. 26, 2003, the contents of which are incorporated by this reference.

BACKGROUND OF THE INVENTION

The present invention relates generally to a real image type zoom finder and an imaging system that incorporates the same, and more specifically to a real image type zoom finder fit for film-loaded cameras, digital cameras, etc. and an imaging system that incorporates such a real image type zoom finder.

Among lens arrangements so for known to obtain zoom finders of the small, thin yet high-zoom-ratio type, there is a lens arrangement comprising, in order from its object side, a negative lens group, a positive lens group, a negative lens group and a positive lens group, wherein zooming is performed by movement of the second and third lens groups.

In recent years, demands for more compact, higher-zoom-ratio zoom finders have been increasingly growing. Typical such prior art constructions are set forth in the following patent publications.

Patent Publication 1
JP-A 8-136806
Patent Publication 2
JP-A 10-319320
Patent Publication 3
JP-A 2000-347101
Patent Publication 4
JP-A 2001-343585

Although these zoom finders of the real image type are small and thin to some degrees or have a high zoom ratio of the order of about 3.5, yet it is difficult to ensure satisfactory zoom ratios when further size reductions are in demand.

SUMMARY OF THE INVENTION

The state of the art being like this, one object of the present invention is to provide a real image type zoom finder that, albeit being reduced in size and thickness, can gain high enough zoom ratios. Another object of the present invention is to provide an imaging system equipped with such a real image type zoom finder.

According to the first aspect of the invention, the first-mentioned object is achievable by the provision of a real image type zoom finder, comprising, in order from its object side, an objective optical system for forming an intermediate image-formation plane, an image-erection optical system for erecting the intermediate image-formation plane formed by said objective optical system, and an eyepiece optical system for viewing said intermediate image-formation plane, characterized in that:

said objective optical system comprises, in order from its object side, a first lens group of negative refracting power, a second lens group of positive refracting power, a third lens group of negative refracting power and a fourth lens group of positive refracting power, and upon zooming from a wide-angle end to a telephoto emd of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said first lens group consists of one single lens of double-concave shape, which satisfies the following condition (1):

$$0 < SF1 < 0.65 \qquad (1)$$

where $SF1 = (r_1 + r_2)/(r_1 - r_2)$ provided that $r_1$ is the axial radius of curvature of the object side-surface of the double-concave lens in the first lens group, and $r_2$ is the axial radius of curvature of the image side-surface of the double-concave lens in the first lens group.

The advantages of, and requirements for the real image type zoom finder constructed according to the first aspect of the invention are now explained.

If the objective optical system in the real image type zoom finder is made up of four lens groups of –+–+ construction in order from its object side, it is then possible to diminish the entrance surface of the zoom finder while a wide range of view is ensured on the wide-angle side, because the negative first lens group is located as the foremost one. It is also easy to gain high zoom ratios at the movable positive second lens group subsequent to the first lens group and the negative third lens group. Moreover, an off-axis light beam apt to diverge at the subsequent positive lens group can be brought so close to the vertical that the image-erection optical system can be made compact.

Since the first lens group and the fourth lens group are designed to stay fixed, the entry of dust, etc. into the zoom objective optical system is prevented, and because zooming is carried out by the movement of a few lens groups, the whole construction including a mechanical mechanism can be simplified.

The negative first lens group is made up of a single lens, so that the first lens group can be slimmed down. Furthermore, if the single lens in the first lens group is configured in a double-concave form, it is then possible to position the principal points of the zoom finder in the first lens group, thereby balancing compactness against correction of distortion.

Condition (1) is provided to define a shape factor more preferable for that double-concave lens. As the lower limit of 0 is not reached, the axial radius of curvature of the object side-surface of the lens becomes small, and the periphery of the lens is likely to hang over the apex of the first surface. Consequently, any attempt to ensure the quantity of light at the rim of the lens would render the effect on compactness slender. Going beyond the upper limit of 0.65 means that the amount of aberrations produced tends to become large owing to a decrease in the radius of curvature of the image side-surface of the lens.

More preferably, the lower limit to condition (1) should be set at 0.3, especially 0.5 or the upper limit should be set at 0.63, especially 0.61.

According to the second aspect of the invention, there is provided a real image type zoom finder, comprising, in order from its object side, an objective optical system for forming an intermediate image-formation plane, an image-erection optical system for erecting the intermediate image-formation plane formed by said objective optical system, and an eyepiece optical system for viewing said intermediate image-formation plane, characterized in that:

said objective optical system comprises, in order from its object side, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein there is provided the image-erection optical system for erection of an image only on an image side of the zoom finder with respect to said fourth lens group, and said fourth lens group and said image-erection optical system are located with a space between them.

The advantages of, and requirements for the real image type zoom finder constructed according to the second aspect of the invention are now explained.

As already explained with reference to the advantages of, and requirements for the first real image type zoom finder, the −+−+ construction in order from the object side of the objective lens system is favorable for setting up a small-format yet high-zoom-ratio finder.

In an arrangement comprising an image-inversion optical system for erection of an image only on the image side of the zoom finder with respect to the positive fourth lens group, i.e., in an arrangement for the erection of an image by plural reflections, the fourth lens group of positive refracting power is positioned on an object side of the zoom finder with respect to a reflecting surface located nearest to the object side and contributing to the erection of an image.

Accordingly, if this positive fourth lens group is allowed to have a plurality of refracting surfaces, it is then possible to hold back aberrations that are produced when an off-axis light beam apt to diverge from the negative third lens group is brought close to the vertical.

According to the third aspect of the invention, the first real image type zoom finder is characterized in that there is provided the image-erection optical system for erection of an image only on an image side of the zoom finder with respect to said fourth lens group, and said fourth lens group and said image-erection optical system are located with a space between them.

The advantage of, and requirement for the real image type zoom finder constructed according to the third aspect of the invention are now explained. With a plurality of refracting surfaces applied to the positive fourth lens group, it is possible to restrain aberrations when an off-axis light beam apt to diverge from the negative third lens group is brought close to the vertical, as described above.

According to the fourth aspect of the invention, the second or third real image type zoom finder is further characterized in that said image-erection optical system comprises a reflecting prism having a planar entrance surface opposite to said fourth lens group.

The advantage of, and requirement for the real image type zoom finder constructed according to the fourth aspect of the invention are now explained. If the front surface of the reflecting prism that is located on the objective optical system side and forms a part of the image-erection optical system is configured in a planar form, it is then possible to cut back fabrication costs.

According to the fifth aspect of the invention, there is provided a real image type zoom finder, comprising, in order from its object side, an objective optical system for forming an intermediate image-formation plane, an image-erection optical system for erecting the intermediate image-formation plane formed by said objective optical system, and an eyepiece optical system for viewing said intermediate image-formation plane, characterized in that:

said objective optical system comprises, in order from its object side, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said third lens group consists of a double-concave form of lens component that comes into axial contact with an air separation only at two surfaces, one located nearest to the object side and another located nearest to the image side of the third lens group, and said lens component satisfies the following condition (2):

$$-0.5 < SF3 < 0.5 \tag{2}$$

where $SF3 = (r_5 + r_6)/(r_5 - r_6)$ provided that $r_5$ is the axial radius of curvature of the object side-surface of the double-concave lens component in the third lens group, and $r_6$ is the axial radius of curvature of the image side-surface of the double-concave lens component in the third lens group.

The advantages of, and requirements for the real image type zoom finder constructed according to the fifth aspect of the invention are now explained.

As already explained in conjunction with the first real image type zoom finder, the −+−+ construction in order from the object side of the objective lens system is favorable for a small-format yet high-zoom-ratio finder.

In this arrangement, if the third lens group is composed solely of a single lens of double-concave shape or a cemented lens of double-concave shape, then it is just only easy to ensure air separations before and after the third lens group but also compactness and high zoom ratios are favorably achievable.

Condition (2) defines the shape of the third lens group, and has relations to correction of aberrations throughout the real image type zoom finder. As the lower limit of −0.5 to this condition is not reached, the radius of curvature of the object side-surface of the double-concave lens component in the third lens group becomes small, rendering the amount of aberrations produced during zooming likely to become large. As the upper limit of 0.5 is exceeded, on the other hand, the radius of curvature of the image side-surface of the double-concave lens component becomes small, again rendering the amount of aberrations produced during zooming likely to become large.

More preferably, the lower limit to condition (2) should be set at −0.3, especially −0.1 or the upper limit should be set at 0.4, especially 0.3.

According to the sixth aspect of the invention, any one of the first to fourth real image type zoom finders is further characterized in that said third lens group consists of a double-concave form of lens component that comes into axial contact with an air separation only at two surfaces, one located nearest to the object side and another located nearest to the image side of the third lens group, and said lens component satisfies the following condition (2):

$$-0.5 < SF3 < 0.5 \tag{2}$$

where $SF3 = (r_5 + r_6)/(r_5 - r_6)$ provided that $r_5$ is the axial radius of curvature of the object side-surface of the double-concave lens component in the third lens group, and $r_6$ is the axial radius of curvature of the image side-surface of the double-concave lens component in the third lens group.

The advantage of, and requirement for the real image type zoom finder constructed according to the sixth aspect of the invention are now explained. As already described, it is just only easy to ensure air separations before and after the third lens group but also compactness and high zoom ratios are favorably achievable.

More preferably, the lower limit to condition (2) should be set at −0.3, especially −0.1 or the upper limit should be set at 0.4, especially 0.3.

According to the seventh aspect of the invention, any one of the first to sixth real image type zoom finders is further characterized in that said fourth lens group consists of a single lens of positive refracting power.

The advantage of, and requirement for the real image type zoom finder constructed according to the seventh aspect of the invention are now explained. By locating a single lens of positive refracting power as the fourth lens group, the fourth lens group can just only be more simplified in construction but also the entrance pupil can be easily located at a farer position with correction of aberrations by a plurality of refracting surfaces. This in turn can make the image-erection optical system compact.

According to the eighth aspect of the invention, any one of the first to seventh real image type zoom finders is further characterized in that said image-erection optical system comprises at least four reflecting surfaces.

The advantage of, and requirement for the real image type zoom finder constructed according to the eighth aspect of the invention are now explained. By turning back an optical path by the reflecting surfaces, the finder optical system can be slimmed down.

According to the ninth aspect of the invention, the eighth real image type zoom finder is further characterized in that said image-erection optical system comprises a prism having a reflecting surface.

The advantage of, and requirement for the real image type zoom finder constructed according to the ninth aspect of the invention are now explained. A certain length of optical path can be easily taken through the image-erection optical system so that the image-inversion optical system can be easily laid out.

According to the $10^{th}$ aspect of the invention, the $8^{th}$ or $9^{th}$ real image type zoom finder is further characterized in that at least one reflecting surface of said at least four reflecting surfaces in said image-erection optical system is located on an object side with respect to said intermediate image plane, and at least one reflecting surface is located on an exit pupil side with respect to said intermediate image-formation plane.

The advantage of, and requirement for the real image type zoom finder constructed according to the $10^{th}$ aspect of the invention are now explained. The reflecting surfaces of the image-erection optical system are distributed to before and after the intermediate image-formation plane, so that an optical path running through the fourth lens group to the intermediate image plane as well as an optical path running through the eyepiece optical system to the intermediate image plane can be turned back. It is thus possible to achieve a compact real image type zoon finder.

According to the $11^{th}$ aspect of the invention, any one of the $1^{st}$ to $10^{th}$ real image type zoom finders is further characterized in that upon zooming from the wide-angle end to the telephoto end, said second lens group moves only toward the object side and upon zooming from the wide-angle end to the telephoto end, said third lens group moves only toward the image side.

The advantages of, and requirements for the real image type zoom finder constructed according to the $11^{th}$ aspect of the invention are now explained.

Movement of the positive second lens group toward the object side alone and the second third lens group toward the image side alone, upon zooming from the wide-angle end to the telephoto end, is well fit for achieving high zoom ratios, because the second lens group and the third lens group can take on a zooming function, with a large change in the spacing between the second lens group and the third lens group. The amount of movement of the second lens group and the third lens group is reduced, and so the range of movement becomes narrow, fit for reductions of the whole finder size.

According to the $12^{th}$ aspect of the invention, any one of $1^{st}$ to $11^{th}$ real image type zoom finders is further characterized in that the surface located nearest to the object side in said first lens group is formed of an aspheric surface axially concave on its object side, wherein said aspheric surface is configured in such a way as to decrease in refracting power with distance from the optical axis.

The advantage of, and requirement for the real image type zoom finder constructed according to the $12^{th}$ aspect of the invention are now explained. If the surface located nearest to the object side in the first lens group is formed of such an aspheric surface as defined above, it is then possible to make good correction for field of curvature at the wide-angle end and spherical aberrations at the telephoto end and prevent the peripheral portion of the lens from hanging over toward the object side. Thus, the size of the zoom finder can be easily reduced.

According to the $13^{th}$ aspect of the invention, any one of the $1^{st}$ to $12^{th}$ real image type zoom finders is further characterized in that said fourth lens group consists of a single lens, both object and image side surfaces of which are formed of aspheric surfaces.

The advantage of, and requirement for the real image type zoom finder constructed according to $13^{th}$ aspect of the invention are now explained. By locating a single lens as the fourth lens group, an entrance pupil is located at a farer position with correction of aberrations, so that the diameter of the image-erection optical system can be diminished. It is thus possible to achieve a compact real image type zoom finder. Moreover, by forming both sides of the fourth lens group of aspheric surfaces, aberration can be well corrected.

According to the $14^{th}$ aspect of the invention, any one of the $1^{st}$ to $13^{th}$ real image type zoom finders is further characterized in that said fourth lens group comprises a single lens, both object and image side surfaces of which are axially convex, wherein at least the image side surface is formed of an aspheric surface that decreases in positive refracting power with distance from the optical axis.

The advantages of, and requirements for the real image type zoom finder constructed according to the $14^{th}$ aspect of the invention are now explained. For the purpose of converging an incident axial light beam, it is preferable to disperse refracting power at both surfaces formed as convex surfaces. For an off-axis light beam, it is preferable that the light beam is converged at the object side-convex surface thereby preventing the diameter of the fourth lens group from becoming too large, and that positive refracting power is slackened at the image side surface or aberrations are held back at the aspheric surface where negative refracting power is found.

According to the 15th aspect of the invention, any one of the 1st to 14th real image type zoom finders is further characterized in that said third lens group satisfies the following condition (3):

$$-1.5 < f_3/f_W < -0.7 \quad (3)$$

where $f_3$ is the focal length of the third lens group, and $f_W$ is the composite focal length from the entrance surface of the objective optical system to the intermediate image plane at the wide-angle end.

The advantages of, and requirements for the real image type zoom finder constructed according to the 15th aspect of the invention are now explained.

Condition (3) is provided to offer a sensible tradeoff among compactness, high zoom ratio and correction of aberrations. As the lower limit of −1.5 is not reached, the amount of movement of the third lens group during zooming becomes large due to a weak refracting power of the third lens group, rendering it difficult to reduce the whole finder size. As the upper limit of −0.7 is exceeded, the refracting power of the third lens group becomes too strong, leading to a large fluctuation of aberrations with zooming.

More preferably, the upper limit to condition (3) should be set at −1.3, especially −1.1 or the upper limit should be set at −0.8, especially −0.9.

According to the 16th aspect of the invention, any one of the 1st to 15th real image type zoom finders is further characterized in that said fourth lens group satisfies the following condition (4):

$$1.0 < f_4/f_W < 1.3 \quad (4)$$

where $f_4$ is the focal length of the fourth lens group, and $f_W$ is the composite focal length from the entrance surface of the objective optical system to the intermediate image plane at the wide-angle end.

The advantages of, and requirements for the real image type zoom finder constructed according to the 16th aspect of the invention are now explained.

Condition (4) is provided to offer a sensible compromise between size reductions for the objective optical system and correction of aberrations. As the lower limit of 1.0 is not reached, the refracting power of the second lens group and the third lens group becomes strong, resulting in a large fluctuation of aberrations with zooming. As the upper limit of 1.3 is exceeded, the refracting power of the second lens group and the third lens group becomes weak or the amount of movement of them for zooming becomes large, rendering size reductions difficult.

More preferably, the lower limit to condition (4) should be set at 1.1, especially 1.15 or the upper limit should be set at 1.27, especially 1.25.

According to the 17th aspect of the invention, any one of the 1st to 16th real image type zoom finders is further characterized in that all said first to said fourth lens groups consist of one single lens.

The advantage of, and requirement for the real image type zoom finder constructed according to the 17th aspect of the invention are now explained. By constructing each lens group of a minimum of one single lens, it is easy to achieve constructional simplification and ensure a variable separation.

According to the 18th aspect of the invention, any one of the 1st to 17th real image type zoom finders is further characterized in that each air lens sandwiched between adjacent lens groups of said first to said fourth lens groups is of meniscus shape.

The advantage of, and requirement for the real image type zoom finder constructed according to the 18th aspect of the invention are now explained. This arrangement is favorable for achieving compactness and high zoom ratios, because it is possible to ensure a wide range for movement of each lens while ensuring the refracting power of each lens.

According to the 19th aspect of the invention, any one of the 1st to 18th real image type zoom finders is further characterized in that said first lens group satisfies the following condition (5):

$$-3.0 < f_1/f_W < -1.0 \quad (5)$$

where $f_1$ is the focal length of the first lens group, and $f_W$ is the composite focal length from the entrance surface of the objective optical system to the intermediate image plane at the wide-angle end.

The advantages of, and requirements for the real image type zoom finder constructed according to the 19th aspect of the invention are now explained.

Condition (5) is provided to offer a sensible compromise between size reductions for the objective optical system and correction of aberrations. As the focal length of the first lens group comes short of the lower limit of −3.0, compactness and high zoom ratios become hard to achieve, because of a decrease in the load of the second lens group on zooming. As the upper limit of −1.0 is exceeded, size and cost reductions become hard to achieve, because the focal length of the first lens group becomes too short, leading to the need of relying on some more lenses.

More preferably, the lower limit to condition (5) should be set at −2.5, especially −2.1 or the upper limit should be set at −1.5, especially −1.8.

According to the 20th aspect of the invention, any one of the 1st to 19th real image type zoom finders is further characterized in that said second lens group satisfies the following condition (6):

$$1.0 < f_2/f_W < 2.0 \quad (6)$$

where $f_2$ is the focal length of the second lens group, and $f_W$ is the composite focal length from the entrance surface of the objective optical system to the intermediate image plane at the wide-angle end.

The advantages of, and requirements for the real image type zoom finder constructed according to the 20th aspect of the invention are now explained.

Condition (6) is provided to offer a sensible compromise between size reductions for the objective optical system and correction of aberrations. As the lower limit of 1.0 is not reached, cost reductions become hard to achieve, because the focal length of the second lens group becomes too short, and some more lenses are needed for correction of aberrations. As the upper limit of 2.0 is exceeded, the load of the second lens group on loading decreases, rendering compactness and high zoom ratios difficult.

More preferably, the lower limit to condition (6) should be set at 1.2, especially 1.25 or the upper limit) should be set at 1.6, especially 1.4.

Alternatively, the focal length of the first, the second, the third, and the fourth lens group could be defined in terms of the composite focal length from the entrance surface of the objective optical system at the telephoto end to the intermediate image plane, as given below.

According to the 21st aspect of the invention, any one of the 1st to 20th real image type zoom finders is further characterized in that said first lens group satisfies the following condition (5)':

$$-0.83 < f_1/f_T < -0.28 \qquad (5)'$$

where $f_1$ is the focal length of the first lens group, and $f_T$ is the composite focal length from the entrance surface of the objective optical system at the telephoto end to the intermediate image plane.

The advantages of, and requirements for the real image type zoom finder constructed according to the 21$^{st}$ aspect of the invention are now explained.

Condition (5)' is provided to offer a sensible compromise between size reductions for the objective optical system and correction of aberrations. As the focal length of the first lens group comes short of the lower limit of −0.83, compactness and high zoom ratios become hard to achieve, because of a decrease in the load of the second lens group on zooming. As the upper limit of −0.28 is exceeded, size and cost reductions become hard to achieve, because the focal length of the first lens group becomes too short, leading to the need of relying on some more lenses.

More preferably, the lower limit to condition (5)' should be set at −0.69, especially −0.58 or the upper limit should be set at −0.42, especially −0.50.

According to the 22$^{nd}$ aspect of the invention, any one of the 1$^{st}$ to 21$^{st}$ real image type zoom finders is further characterized in that said second lens group satisfies the following condition (6)':

$$0.28 < f_2/f_T < 0.56 \qquad (6)'$$

where $f_2$ is the focal length of the second lens group, and $f_T$ is the composite focal length from the entrance surface of the objective optical system at the telephoto end to the intermediate image plane.

The advantages of, and requirements for the real image type zoom finder constructed according to the 22$^{nd}$ aspect of the invention are now explained.

Condition (6)' is provided to offer a sensible compromise between size reductions for the objective optical system and correction of aberrations. As the lower limit of 0.28 is not reached, cost reductions become hard to achieve, because the focal length of the second lens group becomes too short, and some more lenses are needed for correction of aberrations. As the upper limit of 0.56 is exceeded, the load of the second lens group on loading decreases, rendering compactness and high zoom ratios difficult.

More preferably, the lower limit to condition (6)' should be set at 0.33, especially 0.35 or the upper limit should be set at 0.44, especially 0.39.

According to the 23$^{rd}$ aspect of the invention, any one of the 1$^{st}$ to 22$^{nd}$ real image type zoom finders is further characterized in that said third lens group satisfies the following condition (3)':

$$-0.42 < f_3/f_T < -0.19 \qquad (3)'$$

where $f_3$ is the focal length of the third lens group, and $f_T$ is the composite focal length from the entrance surface of the objective optical system at the telephoto end to the intermediate image plane.

The advantages of, and requirements for the real image type zoom finder constructed according to the 23$^{rd}$ aspect of the invention are now explained.

Condition (3)' is provided to offer a sensible tradeoff among compactness, high zoom ratio and correction of aberrations. As the lower limit of −0.42 is not reached, the amount of movement of the third lens group during zooming becomes large due to a weak refracting power of the third lens group, rendering it difficult to reduce the size of the zoom finder system. As the upper limit of −0.19 is exceeded, the refracting power of the third lens group becomes too strong, leading to a large fluctuation of aberrations with zooming.

More preferably, the upper limit to condition (3)' should be set at −0.36, especially −0.30 or the upper limit should be set at −0.22, especially −0.25.

According to the 24$^{th}$ aspect of the invention, any one of the 1$^{st}$ to 23$^{rd}$ real image type zoom finders is further characterized in that said fourth lens group satisfies the following condition (4)':

$$0.28 < f_4/f_T < 0.36 \qquad (4)'$$

where $f_4$ is the focal length of the fourth lens group, and $f_T$ is the composite focal length from the entrance surface of the objective optical system at the telephoto end to the intermediate image plane.

The advantages of, and requirements for the real image type zoom finder constructed according to the 24$^{th}$ aspect of the invention are now explained.

Condition (4)' is provided to offer a sensible compromise between size reductions for the objective optical system and correction of aberrations. As the lower limit of 0.28 is not reached, the refracting power of the second lens group and the third lens group becomes strong, resulting in a large fluctuation of aberrations with zooming. As the upper limit of 0.36 is exceeded, the refracting power of the second lens group and the third lens group becomes weak or the amount of movement of them for zooming becomes large, rendering size reductions difficult.

More preferably, the lower limit to condition (4)' should be set at 0.30, especially 0.32 or the upper limit should be set at 0.35, especially 0.34.

According to the 25$^{th}$ aspect of the invention, any one of the 1$^{st}$ to 24$^{th}$ real image type zoom finders is further characterized in that said image-erection optical system comprises a first prism that includes the first reflecting surface in said real image type zoom finder, the exit surface in said fourth lens group is positioned just before the entrance surface of said prism, and the shape of the entrance surface of said prism is different from that of the exit surface in said fourth lens group, with satisfaction of the following conditions (7) and (8):

$$1.43 < N_{P1} < 1.8 \qquad (7)$$

$$0 \leq D4/DG4 < 0.9 \qquad (8)$$

where D4 is the axial distance from the exit surface in the fourth lens group to the entrance surface of the first prism, DG4 is the real distance from the entrance surface to the exit surface in the fourth lens group, and $N_{P1}$ is the refractive index of the medium of the first prism.

The advantages of, and requirements for the real image type zoom finder constructed according to the 25$^{th}$ aspect of the invention are now explained.

With the positive fourth lens group located just in front of the entrance surface of the image-erection optical system, the occurrence of aberrations can be easily prevented, because an off-axis light beam is refracted by a plurality of refracting surfaces.

With the first reflecting surface in the image-erection optical system that is provided by the prism, there is obtained a high degree of flexibility in designing a bending layout for the inversion of an image.

Condition (7) defines the preferable refractive index of the medium of the first prism. As the lower limit of 1.43 is not reached, the effect on ensuring an optical path length becomes slender, ending up with a decrease in the degree of flexibility in designing the bending layout for the reflecting surface. As the upper limit of 1.8 is exceeded, on the other hand, the material used for the first prism costs much.

Condition (8) defines the air separation between the fourth lens group and the first prism. The value of this condition cannot possibly be below the lower limit of 0. As the upper limit of 0.9 is exceeded, on the other hand, the surface-to-surface separation becomes wide, rendering the length of the zoom finder system apt to become long, or the fourth lens group becomes thick, rendering it difficult to ensure good enough refracting power.

More preferably, the lower limit to condition (7) should be set at 1.47, especially 1.50 or the upper limit should be set at 1.7, especially 1.6.

More preferably for prevention of any surface-to-surface interference during assembling, the lower limit to condition (8) should be set at 0.05, especially 0.1 or the upper limit should be set at 0.6, especially 0.3.

According to the 26$^{th}$ aspect of the invention, any one of the 1$^{st}$ to 25$^{th}$ real image type zoom finders is further characterized in that the finder magnification satisfies the following conditions (9) and (10):

$$0.2 < mw < 0.4 \tag{9}$$

$$0.9 < mt < 2.0 \tag{10}$$

where mw is the finder magnification at the wide-angle end, and mt is the finder magnification at the telephoto end.

The advantages of, and requirements for the real image type zoom finder constructed according to the 26$^{th}$ aspect of the invention are now explained.

The finder optical system of the invention is favorable for achieving a high zoom ratio from the wide-angle side, and well fit for the arrangement for achieving such a finder magnification as described above.

As the lower limit of 0.2 to condition (9) is not reached while condition (10) is satisfied, aberrations are likely to occur with zooming because of too high a zoom ratio. As the upper limit of 0.4 is exceeded, on the other hand, it is difficult to view images over a wide angle of view.

As the lower limit of 0.9 to condition (10) is not reached, the finder magnification on the telephoto side becomes low, rendering it difficult to ensure the zoom ratio demanded. As the upper limit of 2.0 is exceeded, on the other hand, the finder magnification becomes too high to provide diopter adjustment by a viewer's eyeball itself.

More preferably, the lower limit to condition (9) should be set at 0.25, especially 0.27 or the upper limit should be set at 0.35, especially 0.33.

More preferably for prevention of any surface-to-surface interference during assembling, the lower limit to condition (10) should be set at 0.95, especially 1.00 or the upper limit should be set at 1.50, especially 1.20.

According to the 27$^{th}$ aspect of the invention, any one of the 1$^{st}$ to 26$^{th}$ real image type zoom finders is further characterized in that a field stop is located near said intermediate image plane, and the following conditions (11) and (12) are satisfied:

$$28° < \omega_W < 38° \tag{11}$$

$$4° < \omega_T < 12° \tag{12}$$

where $\omega_W$ is the maximum half angle of view at the wide-angle end, and $\omega_T$ is the maximum half angle of view at the telephoto end.

The advantage of, and requirement for the real image type zoom finder constructed according to the 27$^{th}$ aspect of the invention are now explained.

The finder optical system of the invention is favorable for a wide-angle, high-zoom-ratio finder, and should preferably be constructed according to the above arrangement.

As the lower limit of 28° to condition (11) is not reached, the angle of view at the wide-angle end becomes narrow. As the upper limit of 38° is exceeded, on the other hand, correction of off-axis aberrations becomes difficult.

As the lower limit of 4° to condition (12) is not reached, the angle of view on the telephoto side becomes too low to provide diopter adjustment by a viewer's eyeball itself. As the upper limit of 12° is exceeded, on the other hand, the angle of view at the telephoto end becomes wide.

More preferably, the lower limit to condition (11) should be set at 30°, especially 32° or the upper limit should be set at 35°, especially 33°.

More preferably for prevention of any surface-to-surface interference during assembling, the lower limit to condition (12) should be set at 6°, especially 8° or the upper limit should be set at 10°, especially 9°.

According to the 28$^{th}$ aspect of the invention, any one of the 1$^{st}$ to 27$^{th}$ real image type zoom finders is further characterized by satisfying the following conditions (13), (14) and (15):

$$0.20 < D1_W/DT < 0.40 \tag{13}$$

$$0.20 < D3_W/DT < 0.40 \tag{14}$$

$$0.40 < D2_T/DT < 0.65 \tag{15}$$

where $D1_W$ is an air separation between the first lens group and the second lens group at the wide-angle end, $D3_W$ is an air separation between the third lens group and the fourth lens group at the wide-angle end, $D2_T$ is an air separation between the second lens group and the third lens group at the telephoto end, and DT is a real distance from the entrance surface in the first lens group to the exit surface in the fourth lens group.

The advantages of, and requirements for the real image type zoom finder constructed according to the 28$^{th}$ aspect of the invention are now explained.

The above conditions define together a more preferable group-to-group separation with respect to the second lens group and the third lens group. By satisfaction of these conditions, loads of zooming on the second lens group and the third lens group can be easily balanced.

As the lower limit of 0.20 to condition (13) is not reached, the load of zooming on the second lens group decreases, and as the upper limit of 0.40 is exceeded, the load of zooming on the second lens group increases.

As the lower limit of 0.20 to condition (14) is not reached, the load of zooming on the third lens group decreases, and as the upper limit of 0.40 is exceeded, the load of zooming on the third lens group increases.

As the lower limit of 0.40 to condition (15) is not reached, a combined load of zooming on the second lens group and the third lens group decreases, and as the upper limit of 0.65 is exceeded, each lens becomes thin, rendering proper distribution of refracting power difficult.

More preferably, the lower limit to condition (13) should be set at 0.24, especially 0.27 or the upper limit should be set at 0.36, especially 0.32.

More preferably, the lower limit to condition (14) should be set at 0.24, especially 0.27 or the upper limit should be set at 0.36, especially 0.32.

More preferably, the lower limit to condition (15) should be set at 0.45, especially 0.48 or the upper limit should be set at 0.60, especially 0.55.

According to the 29$^{th}$ aspect of the invention, any one of the 1$^{st}$ to 28$^{th}$ real image type zoom finders is further characterized in that said image-erection optical system comprises two prisms, one being a roof reflecting prism located on an object side of the zoom finder with respect to said intermediate image-formation plane and the other being a penta prism located on a viewer side with respect to said intermediate image-formation plane, wherein said roof reflecting prism is designed such that incident light is reflected at an acute angle, leaving said roof reflecting prism, and said penta prism is designed such that incident light leaves said penta prism substantially parallel with the optical axis of said objective optical system.

The advantage of, and requirement for the real image type zoom finder constructed according to the 29$^{th}$ aspect of the invention are now explained. An optical path length can be easily ensured by the prisms, and the thickness in the thickness, horizontal and height directions of the finder can be advantageously reduced by turning back of light by the reflecting surface.

According to the 30$^{th}$ aspect of the invention, the 29$^{th}$ real image type zoom finder is further characterized in that the entrance surface of said penta prism is a convex surface.

The advantage of, and requirement for the real image type zoom finder constructed according to the 30$^{th}$ aspect of the invention are now explained. By imparting a condenser lens action to the penta prism, the number of parts involved can be reduced.

According to the 31$^{st}$ aspect of the invention, the 29$^{th}$ or 30$^{th}$ real image type zoom finder is further characterized in that said eyepiece optical system comprises a double-convex lens located with an air separation from said penta prism, the axial curvature of the object side-surface thereof is stronger than that of the viewer side-surface thereof, and at least the viewer side-surface thereof is made up of an aspheric surface that decreases in positive refracting power with distance of the optical axis.

The advantage of, and requirement for the real image type zoom finder constructed according to the 31$^{st}$ aspect of the invention are now explained. Both axial aberrations and off-axis aberrations are well corrected.

According to the 32$^{nd}$ aspect of the invention, there is provided an imaging system comprising a real image type zoom finder as recited in any one of the 1$^{st}$ to 31$^{st}$ aspects of the invention and an imaging optical system having an optical axis different from that of said zoom finder.

The advantage of, and requirement for the imaging system constructed according to the 32$^{nd}$ aspect of the invention are now explained.

The real image type zoom finder according to the invention could be used on an imaging system for compact digital cameras, film-loaded cameras, etc. equipped with an imaging optical system having an optical axis different from that of a finder.

In the invention, it is acceptable that two or more of the 1$^{st}$ to 32$^{nd}$ arrangements are combined together at the same time, and two or more of conditions (1) to (15) are satisfied at the same time.

It is also acceptable that the upper and lower limits to conditions (1) to (15) are changed to the values described above (inclusive of the corresponding values in the examples given later), as desired.

According to the invention set out above, it is possible to provide a real image type zoom finder that, albeit being reduced in size and thickness, can ensure high zoom ratios. It is also possible to provide a small-format imaging system that incorporates such a real image type zoom finder.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1A:
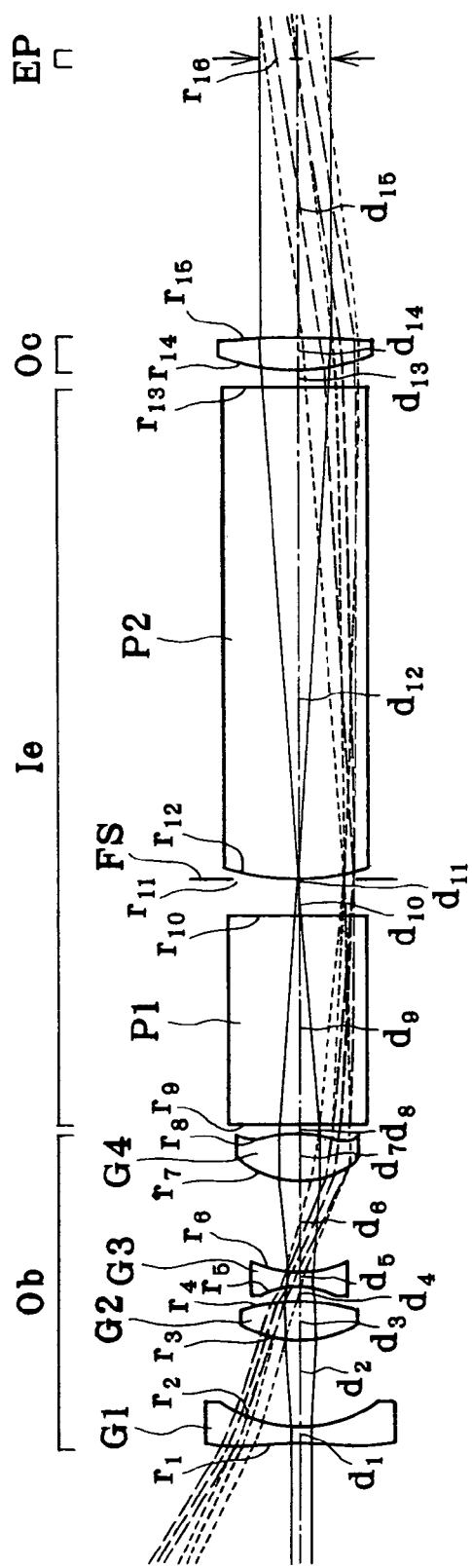
FIGS. 1(a) and 1(b) are taken-apart sectional optical path diagrams for Example 1 at the wide-angle end (a) and telephoto end (b) of the real image type zoom finder according to the invention.
Figure 1B:
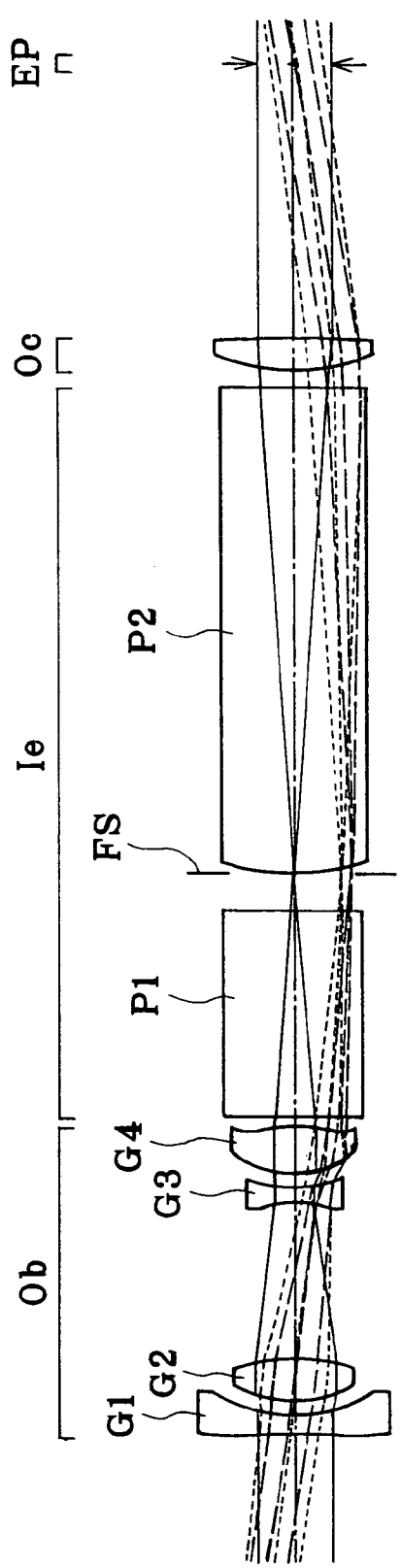
Figure 2:
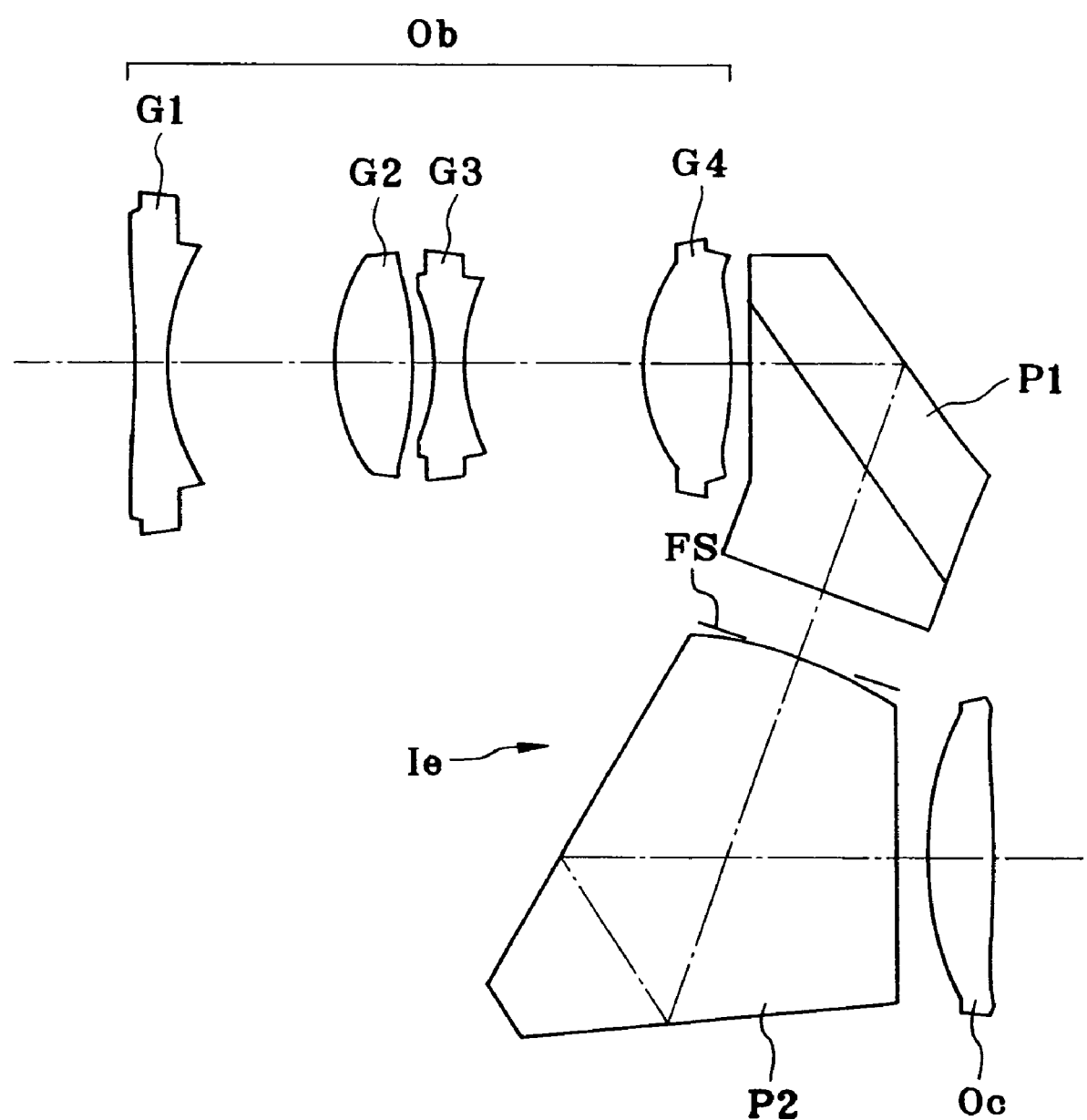
FIG. 2 is a sectional view of Example 1 constructed using actual prisms.

The real image type zoom finder of the invention is now explained with reference to Examples 1, 2 and 3 with data given later. FIGS. 1(a) and 1(b) are sectional views for Example 1 at the wide-angle end (a) and telephoto end (b). In this regard, it is noted that optical paths for the first and second prisms P1 and P2 are shown as being taken apart. In an actual application, however, the first and second prisms P1 and P2 are set up in the form of a roof reflecting prism and a penta prism, respectively, as shown in FIG. 2. Sectional views for Examples 2 and 3 are not provided because of being substantially similar to FIG. 1.

The real image type zoom finder according to each of Examples 1, 2 and 3 is built up of an objective optical system Ob for forming an intermediate image on an intermediate image plane (at a field stop FS position), an image-erection optical system Ie for erecting an intermediate image formed on the intermediate image plane (at the field step FS position) and an eyepiece optical system Oc for viewing an erected intermediate image, as shown in FIG. 1. The objective optical system Ob consists of a first lens group G1 of negative refracting power, a second lens group G2 of positive refracting power, a third lens group G3 of negative refracting power and a fourth lens group G4 of positive refracting power. Each lens group consists of one lens; the first lens group G1 consists of a double-concave negative lens, the second lens group G2 consists of a double-convex lens, the third lens group G3 consists of a double-concave negative lens, and the fourth lens group G4 consists of a double-convex lens. The image-erection optical system Ie consists of a first prism P1 and a second prism P2. The first prism P1 is made up of a plane-parallel plate in a taken-apart optical path state, and the second prism P2 is made up of a planoconvex lens in a taken-apart optical path state. The intermediate image plane (at the field stop FS position) is in alignment with the convex lens acting surface given by the entrance surface of the second prism P2, and the entrance convex lens acting surface acts as a field lens. The eyepiece optical system Oc consists of one double-convex lens, wherein the object side-surface thereof has a large curvature. In FIG. 1, EP stands for an eye point.

Eight aspheric surfaces are used; one at the object side-surface of the double-concave negative lens in the first lens group G1, one at the object side-surface of the double-convex lens in the second lens group G2, two at both surfaces of the double-concave negative lens in the third lens group G3, two at both surfaces of the double-convex lens in the fourth lens group G4, and two at both surfaces of the double-convex lens in the eyepiece optical system Oc.

Upon zooming from the wide-angle side to the telephoto side, while the first lens group G1 and the fourth lens group G4 in the objective optical system Ob remain fixed, the second lens group G2 moves in one direction alone toward the object side and the third lens group G3 moves in one direction alone toward the image side.

Numerical data on Examples 1–3 are given below. The symbols used hereinafter but not hereinbefore stand for:
ω: half angle of view (°),
m: finder magnification,
WE: wide-angle end,
TE: telephoto end,
$r_1, r_2, \ldots$ : radius of curvature of each lens surface (mm),
$d_1, d_2, \ldots$ : separation between adjacent lens surfaces (mm),
$n_{d1}, n_{d2}, \ldots$ : d-line refractive index of each lens,
$V_{d1}, V_{d2}, \ldots$ : Abbe number of each lens,
$r_0$: object plane, and
$d_0$: object distance.

Here let x denote the direction of axial propagation of light, and y indicate a direction orthogonal to the optical axis. Then, aspheric surface configuration is represented by $$x=(y^2/r)/[1+\{1-P(y/r^2)\}^{1/2}]+A_4y^4+A_6y^6+A_8y^8+A_{10}y^{10}$$

where r is a paraxial radius of curvature, P is a conical constant, and $A_4$, $A_6$, $A_8$ and $A_{10}$ are the $4^{th}$, $6^{th}$, $8^{th}$ and $10^{th}$ aspheric coefficients, respectively.

EXAMPLE 1

| | | | |
|---|---|---|---|
| $r_0 = \infty$ (Object) | $d_0 = 3000$ | | |
| $r_1 = -28.919$ (Aspheric) | $d_1 = 1.01$ | $n_{d1} = 1.52542$ | $v_{d1} = 55.78$ |
| $r_2 = 7.431$ | $d_2 =$ (Variable) | | |
| $r_3 = 5.033$ (Aspheric) | $d_3 = 2.40$ | $n_{d2} = 1.49236$ | $v_{d2} = 57.86$ |
| $r_4 = -12.278$ | $d_4 =$ (Variable) | | |
| $r_5 = -5.662$ (Aspheric) | $d_5 = 0.85$ | $n_{d3} = 1.49236$ | $v_{d3} = 57.86$ |
| $r_6 = 5.222$ (Aspheric) | $d_6 =$ (Variable) | | |
| $r_7 = 5.507$ (Aspheric) | $d_7 = 2.65$ | $n_{d4} = 1.52542$ | $v_{d4} = 55.78$ |
| $r_8 = -8.500$ (Aspheric) | $d_8 = 0.50$ | | |
| $r_9 = \infty$ | $d_9 = 12.10$ | $n_{d5} = 1.52542$ | $v_{d5} = 55.78$ |

-continued

| | | | |
|---|---|---|---|
| $r_{10} = \infty$ | $d_{10} = 2.18$ | | |
| $r_{11} = \infty$ (FS) | $d_{11} = 0.00$ | | |
| $r_{12} = 14.953$ | $d_{12} = 27.90$ | $n_{d6} = 1.52542$ | $v_{d6} = 55.78$ |
| $r_{13} = \infty$ | $d_{13} = 0.95$ | | |
| $r_{14} = 13.870$ (Aspheric) | $d_{14} = 1.80$ | $n_{d7} = 1.49236$ | $v_{d7} = 57.86$ |
| $r_{15} = -32.698$ (Aspheric) | $d_{15} = 15.50$ | | |
| $r_{16} = \infty$ (EP) | | | |

Aspherical Coefficients

1st surface $K = -3.04$
$A_4 = 6.44 \times 10^{-4}$
$A_6 = 1.49 \times 10^{-5}$
$A_8 = -1.49 \times 10^{-6}$
$A_{10} = 3.52 \times 10^{-8}$ 3rd surface $K = -0.50$
$A_4 = -1.17 \times 10^{-3}$
$A_6 = -3.49 \times 10^{-6}$
$A_8 = -6.99 \times 10^{-7}$
$A_{10} = 7.93 \times 10^{-8}$ 5th surface $K = -1.51$
$A_4 = -3.38 \times 10^{-3}$
$A_6 = -3.86 \times 10^{-5}$
$A_8 = -1.51 \times 10^{-4}$
$A_{10} = 4.36 \times 10^{-5}$ 6th surface $K = 1.20$
$A_4 = -5.87 \times 10^{-3}$
$A_6 = 7.38 \times 10^{-5}$
$A_8 = -6.03 \times 10^{-5}$
$A_{10} = 1.20 \times 10^{-5}$ 7th surface $K = -0.34$
$A_4 = 5.07 \times 10^{-4}$
$A_6 = -7.42 \times 10^{-5}$
$A_8 = 1.46 \times 10^{-5}$
$A_{10} = -9.79 \times 10^{-8}$ 8th surface $K = -1.43$
$A_4 = 1.92 \times 10^{-3}$
$A_6 = 7.01 \times 10^{-5}$
$A_8 = -7.59 \times 10^{-6}$
$A_{10} = 1.74 \times 10^{-6}$ 14th surface $K = 0.87$
$A_4 = 3.37 \times 10^{-4}$
$A_6 = 5.82 \times 10^{-6}$
$A_8 = -7.95 \times 10^{-7}$
$A_{10} = 3.75 \times 10^{-8}$ 15th surface $K = -8.85$
$A_4 = 4.39 \times 10^{-4}$
$A_6 = 2.13 \times 10^{-6}$
$A_8 = -1.67 \times 10^{-7}$
$A_{10} = 1.74 \times 10^{-8}$ Zooming Data

| | WE | TE |
|---|---|---|
| f (mm) | 5.703514 | 20.39181 |
| ω (°) | 32.18 | 8.79 |
| m | 0.29 | 1.03 |
| $d_2$ | 4.84 | 0.82 |
| $d_4$ | 0.73 | 9.16 |
| $d_6$ | 5.32 | 0.91 |

-continued

| | |
|---|---|
| SF1 | 0.59 |
| SF3 | 0.04 |
| $f_1/f_W$ | −1.95 |
| $f_2/f_W$ | 1.33 |
| $f_3/f_W$ | −0.94 |
| $f_4/f_W$ | 1.19 |
| $f_1/f_T$ | −0.55 |
| $f_2/f_T$ | 0.37 |
| $f_3/f_T$ | −0.26 |
| $f_4/f_T$ | 0.33 |
| $N_{p1}$ | 1.52542 |
| D4/DG4 | 0.1887 |
| $D1_W/DT$ | 0.272 |
| $D3_W/DT$ | 0.299 |
| $D2_T/DT$ | 0.515 |

EXAMPLE 2

| | | | |
|---|---|---|---|
| $r_0 = \infty$ (Object) | $d_0 = 3000$ | | |
| $r_1 = -27.225$ (Aspheric) | $d_1 = 1.01$ | $n_{d1} = 1.52542$ | $\nu_{d1} = 55.78$ |
| $r_2 = 7.459$ | $d_2 =$ (Variable) | | |
| $r_3 = 5.114$ (Aspheric) | $d_3 = 2.40$ | $n_{d2} = 1.49236$ | $\nu_{d2} = 57.86$ |
| $r_4 = -11.782$ | $d_4 =$ (Variable) | | |
| $r_5 = -6.753$ (Aspheric) | $d_5 = 0.85$ | $n_{d3} = 1.49236$ | $\nu_{d3} = 57.86$ |
| $r_6 = 4.693$ (Aspheric) | $d_6 =$ (Variable) | | |
| $r_7 = 5.383$ (Aspheric) | $d_7 = 2.65$ | $n_{d4} = 1.52542$ | $\nu_{d4} = 55.78$ |
| $r_8 = -9.102$ (Aspheric) | $d_8 = 0.50$ | | |
| $r_9 = \infty$ | $d_9 = 12.10$ | $n_{d5} = 1.52542$ | $\nu_{d5} = 55.78$ |
| $r_{10} = \infty$ | $d_{10} = 2.18$ | | |
| $r_{11} = \infty$ (FS) | $d_{11} = 0.00$ | | |
| $r_{12} = 14.533$ | $d_{12} = 27.90$ | $n_{d6} = 1.52542$ | $\nu_{d6} = 55.78$ |
| $r_{13} = \infty$ | $d_{13} = 0.95$ | | |
| $r_{14} = 14.717$ (Aspheric) | $d_{14} = 1.80$ | $n_{d7} = 1.49236$ | $\nu_{d7} = 57.86$ |
| $r_{15} = -28.483$ (Aspheric) | $d_{15} = 15.50$ | | |
| $r_{16} = \infty$ (EP) | | | |

Aspherical Coefficients

1st surface

K = −3.12
$A_4 = 6.85 \times 10^{-4}$
$A_6 = 1.17 \times 10^{-5}$
$A_8 = -1.46 \times 10^{-6}$
$A_{10} = 3.71 \times 10^{-8}$ 3rd surface K = −0.51
$A_4 = -1.15 \times 10^{-3}$
$A_6 = -1.05 \times 10^{-5}$
$A_8 = 7.53 \times 10^{-7}$
$A_{10} = 6.54 \times 10^{-10}$ 5th surface K = −1.37
$A_4 = -4.53 \times 10^{-3}$
$A_6 = -9.90 \times 10^{-5}$
$A_8 = -9.25 \times 10^{-5}$
$A_{10} = 3.58 \times 10^{-5}$ 6th surface K = 1.19
$A_4 = -8.35 \times 10^{-3}$
$A_6 = 1.59 \times 10^{-4}$
$A_8 = -6.44 \times 10^{-5}$
$A_{10} = 1.13 \times 10^{-5}$ 7th surface K = −0.36
$A_4 = 5.42 \times 10^{-4}$
$A_6 = -4.32 \times 10^{-5}$
$A_8 = 1.43 \times 10^{-5}$
$A_{10} = -1.34 \times 10^{-7}$ -continued 8th surface K = −1.50
$A_4 = 2.05 \times 10^{-3}$
$A_6 = 6.69 \times 10^{-5}$
$A_8 = -1.29 \times 10^{-6}$
$A_{10} = 1.58 \times 10^{-6}$ 14th surface K = 1.00
$A_4 = 2.94 \times 10^{-4}$
$A_6 = 7.14 \times 10^{-6}$
$A_8 = -8.48 \times 10^{-7}$
$A_{10} = 5.56 \times 10^{-8}$ 15th surface K = −9.10
$A_4 = 4.00 \times 10^{-4}$
$A_6 = 1.28 \times 10^{-6}$
$A_8 = -1.45 \times 10^{-7}$
$A_{10} = 3.93 \times 10^{-8}$ Zooming Data

| | WE | TE |
|---|---|---|
| f (mm) | 5.704724 | 20.56929 |
| ω (°) | 32.15 | 8.71 |
| m | 0.29 | 1.04 |
| $d_2$ | 4.83 | 0.80 |
| $d_4$ | 0.63 | 9.21 |
| $d_6$ | 5.43 | 0.88 |

| | |
|---|---|
| SF1 | 0.57 |
| SF3 | 0.18 |
| $f_1/f_W$ | −1.93 |
| $f_2/f_W$ | 1.33 |
| $f_3/f_W$ | −0.96 |
| $f_4/f_W$ | 1.20 |
| $f_1/f_T$ | −0.53 |
| $f_2/f_T$ | 0.37 |
| $f_3/f_T$ | −0.27 |
| $f_4/f_T$ | 0.33 |
| $N_{p1}$ | 1.52542 |
| D4/DG4 | 0.1887 |
| $D1_W/DT$ | 0.271 |
| $D3_W/DT$ | 0.305 |
| $D2_T/DT$ | 0.517 |

EXAMPLE 3

| | | | |
|---|---|---|---|
| $r_0 = \infty$ (Object) | $d_0 = 3000$ | | |
| $r_1 = -27.563$ (Aspheric) | $d_1 = 1.00$ | $n_{d1} = 1.52542$ | $\nu_{d1} = 55.78$ |
| $r_2 = 7.681$ | $d_2 =$ (Variable) | | |
| $r_3 = 5.128$ (Aspheric) | $d_3 = 2.24$ | $n_{d2} = 1.49236$ | $\nu_{d2} = 57.86$ |
| $r_4 = -12.175$ | $d_4 =$ (Variable) | | |
| $r_5 = -5.515$ (Aspheric) | $d_5 = 0.85$ | $n_{d3} = 1.49236$ | $\nu_{d3} = 57.86$ |
| $r_6 = 5.407$ (Aspheric) | $d_6 =$ (Variable) | | |
| $r_7 = 5.504$ (Aspheric) | $d_7 = 2.82$ | $n_{d4} = 1.52542$ | $\nu_{d4} = 55.78$ |
| $r_8 = -8.566$ (Aspheric) | $d_8 = 0.50$ | | |
| $r_9 = \infty$ | $d_9 = 12.55$ | $n_{d5} = 1.56883$ | $\nu_{d5} = 56.36$ |
| $r_{10} = \infty$ | $d_{10} = 2.18$ | | |
| $r_{11} = \infty$ (FS) | $d_{11} = 0.00$ | | |
| $r_{12} = 15.034$ | $d_{12} = 27.90$ | $n_{d6} = 1.52542$ | $\nu_{d6} = 55.78$ |
| $r_{13} = \infty$ | $d_{13} = 0.95$ | | |
| $r_{14} = 13.678$ (Aspheric) | $d_{14} = 1.80$ | $n_{d7} = 1.49236$ | $\nu_{d7} = 57.86$ |
| $r_{15} = -33.937$ (Aspheric) | $d_{15} = 15.50$ | | |
| $r_{16} = \infty$ (EP) | | | |

-continued

| Aspherical Coefficients |
|---|
| 1st surface |

$K = -4.57$
$A_4 = 5.85 \times 10^{-4}$
$A_6 = 2.02 \times 10^{-5}$
$A_8 = -1.82 \times 10^{-6}$
$A_{10} = 4.29 \times 10^{-8}$ 3rd surface $K = -0.49$
$A_4 = -1.13 \times 10^{-3}$
$A_6 = -1.08 \times 10^{-5}$
$A_8 = 2.43 \times 10^{-7}$
$A_{10} = 2.81 \times 10^{-8}$ 5th surface $K = -1.41$
$A_4 = -2.83 \times 10^{-3}$
$A_6 = -6.75 \times 10^{-5}$
$A_8 = -1.38 \times 10^{-4}$
$A_{10} = 3.92 \times 10^{-5}$ 6th surface $K = 1.30$
$A_4 = -5.38 \times 10^{-3}$
$A_6 = 8.55 \times 10^{-5}$
$A_8 = -6.37 \times 10^{-5}$
$A_{10} = 1.18 \times 10^{-5}$ 7th surface $K = -0.39$
$A_4 = 4.38 \times 10^{-4}$
$A_6 = -4.43 \times 10^{-5}$
$A_8 = 1.14 \times 10^{-5}$
$A_{10} = -1.38 \times 10^{-7}$ 8th surface $K = -0.72$
$A_4 = 2.04 \times 10^{-3}$
$A_6 = 5.24 \times 10^{-5}$
$A_8 = -1.02 \times 10^{-6}$
$A_{10} = 9.94 \times 10^{-7}$ 14th surface $K = 0.91$
$A_4 = 2.49 \times 10^{-4}$
$A_6 = 5.70 \times 10^{-6}$
$A_8 = -1.24 \times 10^{-6}$
$A_{10} = 6.66 \times 10^{-8}$ 15th surface $K = -8.78$
$A_4 = 3.52 \times 10^{-4}$
$A_6 = 2.38 \times 10^{-6}$
$A_8 = -6.58 \times 10^{-7}$
$A_{10} = 5.18 \times 10^{-8}$

| Zooming Data | | |
|---|---|---|
| | WE | TE |
| f (mm) | 5.704753 | 20.55027 |
| ω (°) | 32.21 | 8.73 |
| m | 0.29 | 1.04 |
| $d_2$ | 4.91 | 0.80 |
| $d_4$ | 0.69 | 9.21 |
| $d_6$ | 5.28 | 0.88 |

| | |
|---|---|
| SF1 | 0.56 |
| SF3 | 0.01 |
| $f_1/f_W$ | -1.98 |
| $f_2/f_W$ | 1.34 |
| $f_3/f_W$ | -0.95 |
| $f_4/f_W$ | 1.20 |
| $f_1/f_T$ | -0.55 |
| $f_2/f_T$ | 0.37 |
| $f_3/f_T$ | -0.26 |
| $f_4/f_T$ | 0.33 |
| $N_{p1}$ | 1.56883 |
| D4/DG4 | 0.1773 |
| $D1_W$/DT | 0.276 |
| $D3_W$/DT | 0.297 |
| $D2_T$/DT | 0.518 |

Figure 3A:
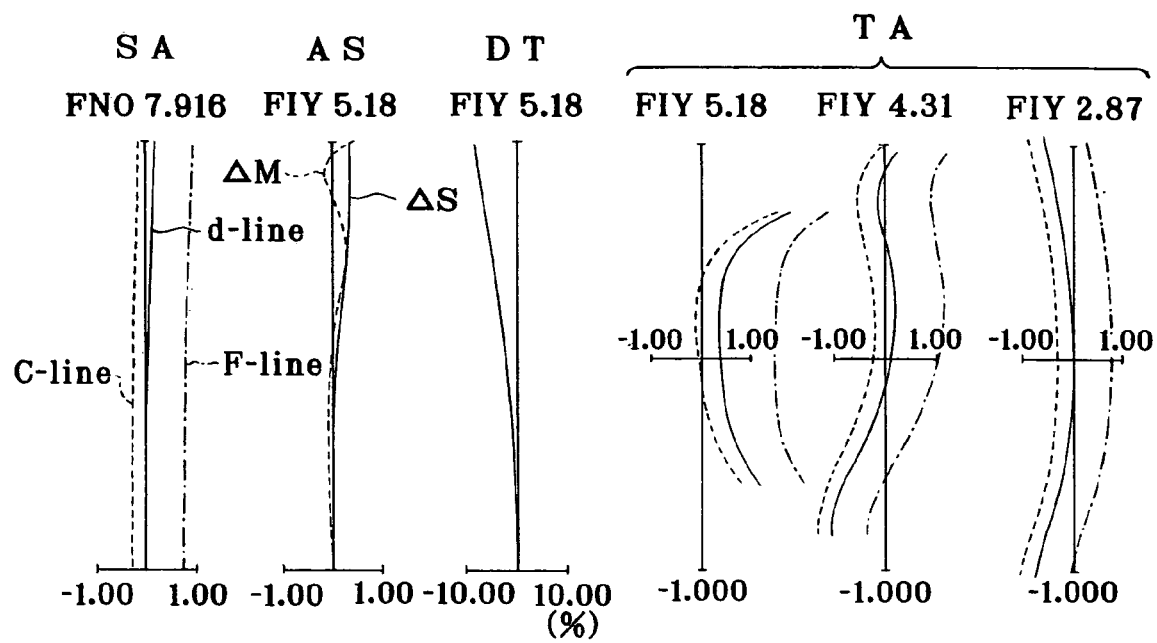
FIGS. 3(a) and 3(b) are aberration diagrams at the wide-angle end (a) and telephoto end (b) for Example 1 wherein ideal lenses are located after the exit pupil.
Figure 3B:
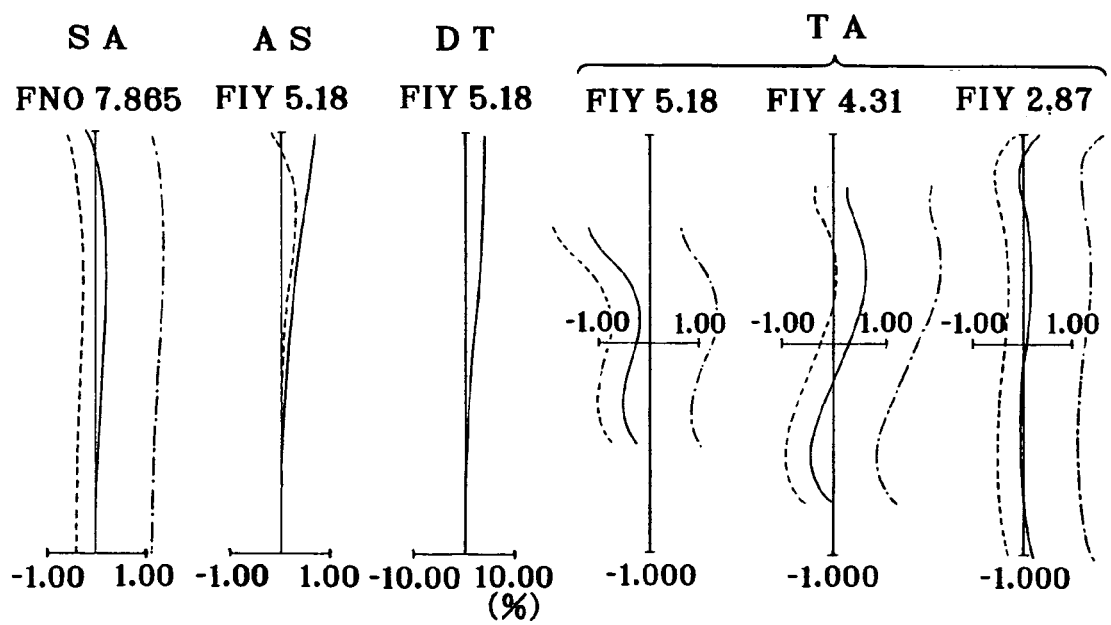
Figure 4A:
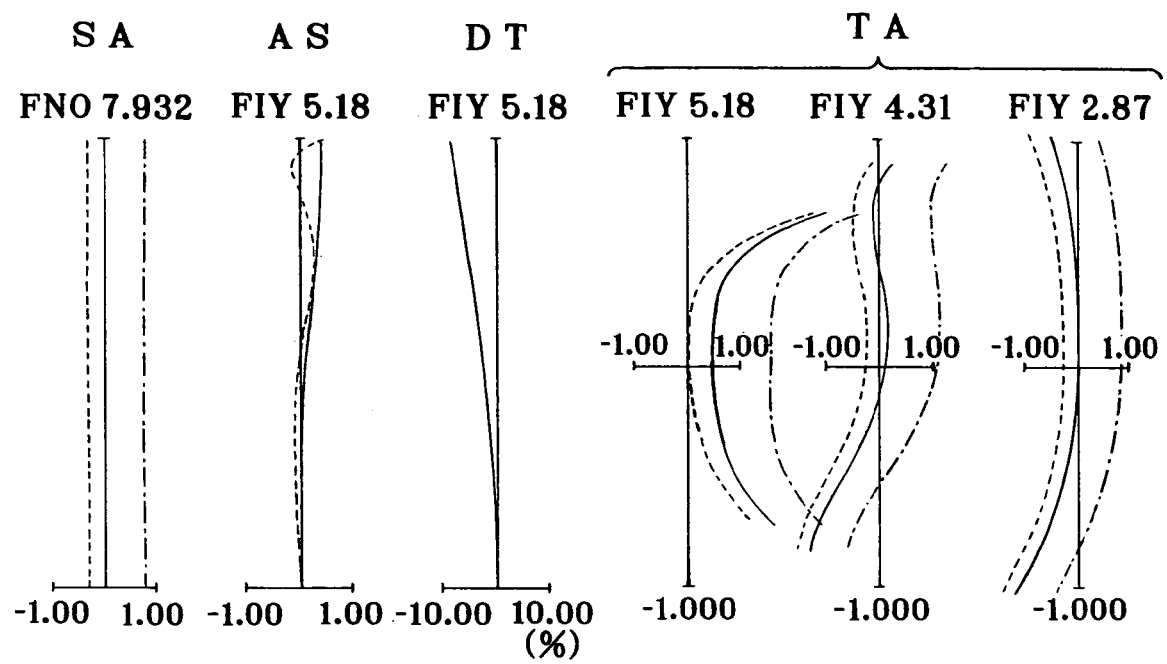
FIGS. 4(a) and 4(b) are aberration diagrams at the wide-angle end (a) and telephoto end (b) for Example 2 wherein ideal lenses are located after the exit pupil.
Figure 4B:
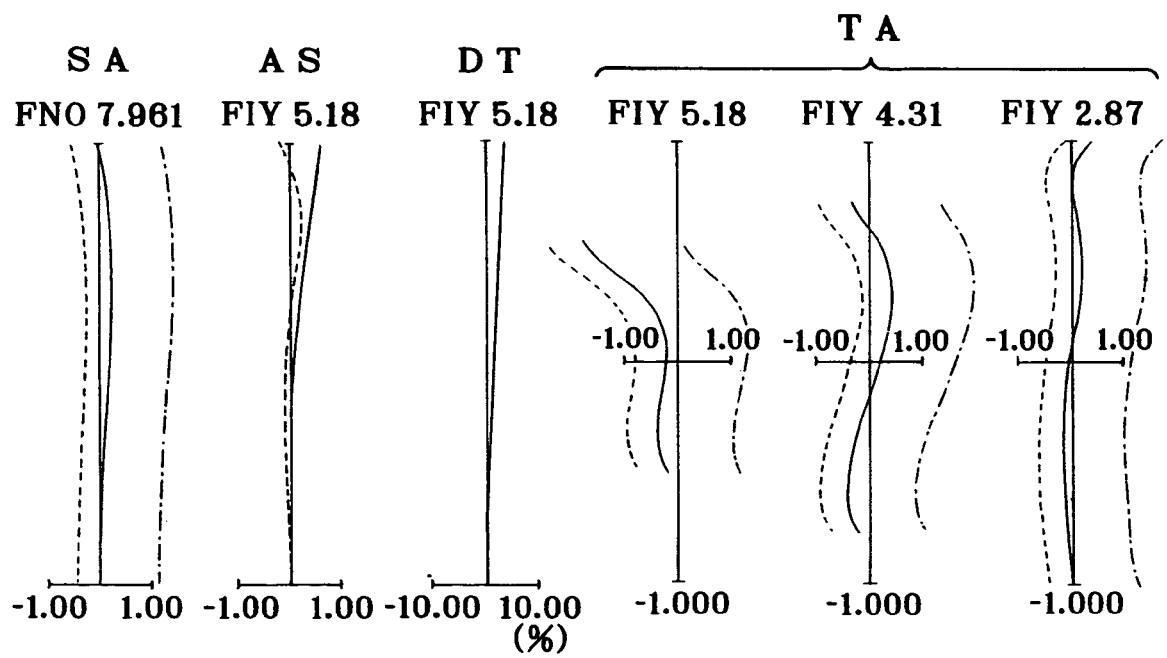
Figure 5A:
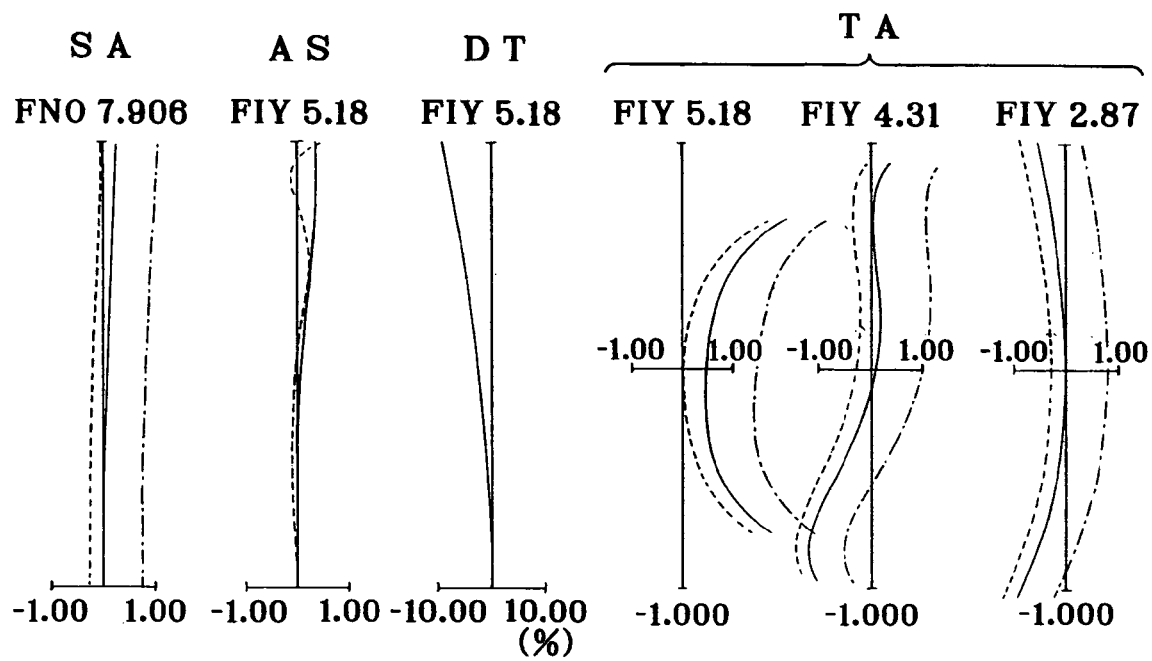
FIGS. 5(a) and 5(b) are aberration diagrams at the wide-angle end (a) and telephoto end (b) for Example 3 wherein ideal lenses are located after the exit pupil.
Figure 5B:
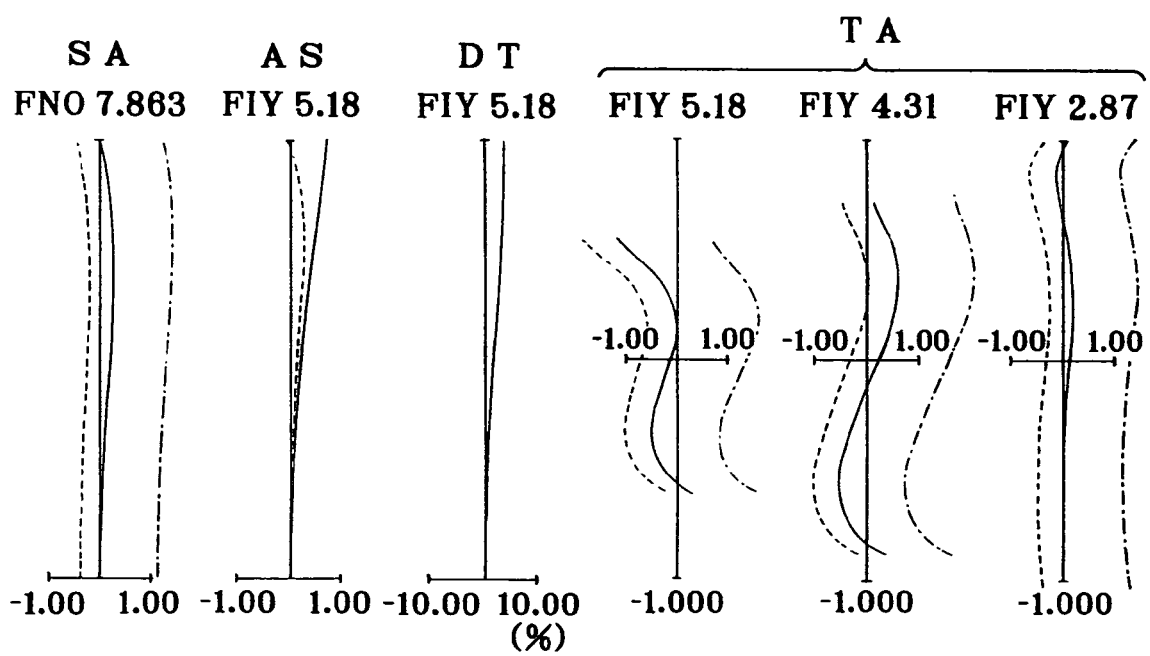

FIGS. 3(a) and 3(b) are aberration diagrams for Example 1 at the wide-angle and telephoto ends, respectively, when ideal lenses are located after the exit pupil EP, with "SA", "AS", "DT" and "TA" standing for spherical aberrations, astigmatism, distortion and transverse aberrations, respectively. "FI" in the drawings indicates an image height. FIGS. 4(a) and 4(b) and 5(a) and 5(b) are similar aberration diagrams for Examples 2 and 3.

As already described, the first prism P1 and the second prism P2 are provided as a roof reflecting prism and a penta prism, respectively, as shown in FIG. 2. The roof reflecting prism P1 is designed such that incident light via the objective optical system Ob is reflected at an acute angle and the reflected light leaves it, and the penta prism P2 is designed such that light leaves it substantially parallel with the optical axis of the objective optical system Ob, traveling toward the eyepiece optical system Oc.

The double-convex lens in the eyepiece optical system is designed such that the axial curvature of its object side-surface is stronger than that of its viewer side-surface, and that at least its viewer side-surface is made up of an aspheric surface whose positive refractive index becomes weak with distance from its center.

Preferably, the field stop FS should be provided by a mechanical frame having a rectangular opening or a frame indicated on a liquid crystal display device.

The real image type zoom finder according to the invention could be used as a phototaking optical system in image pickup devices for film-loaded cameras, digital cameras, etc.

Figure 6:
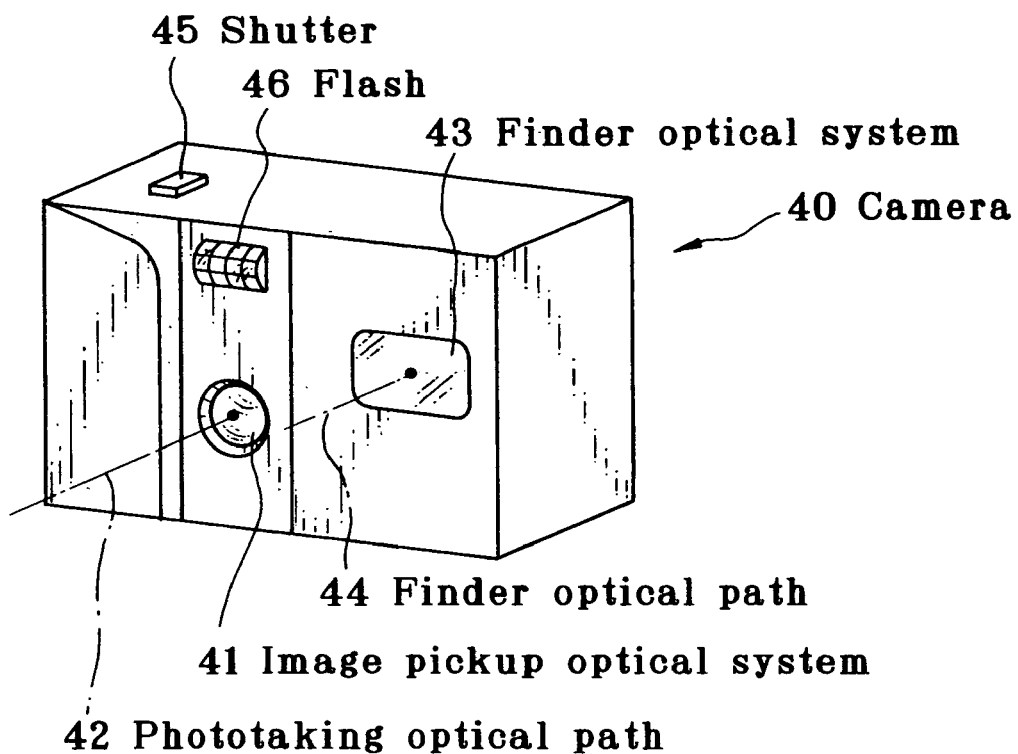
FIG. 6 is a front perspective view of a digital camera to which the real image type zoom finder of the invention is applied.
Figure 7:
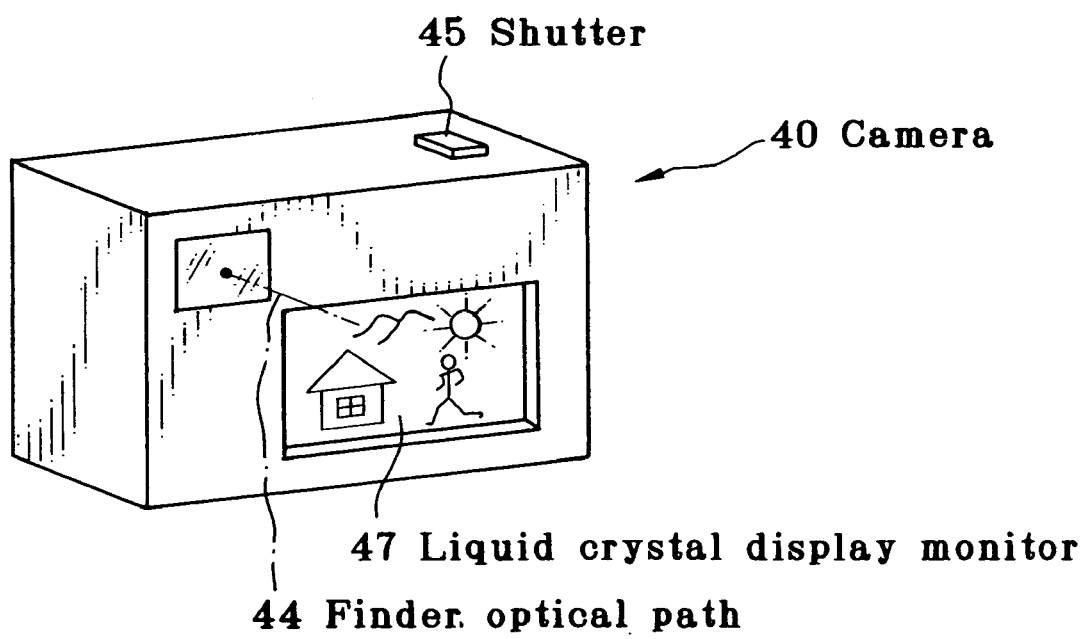
FIG. 7 is a rear perspective view of the digital camera of FIG. 6.
Figure 8:
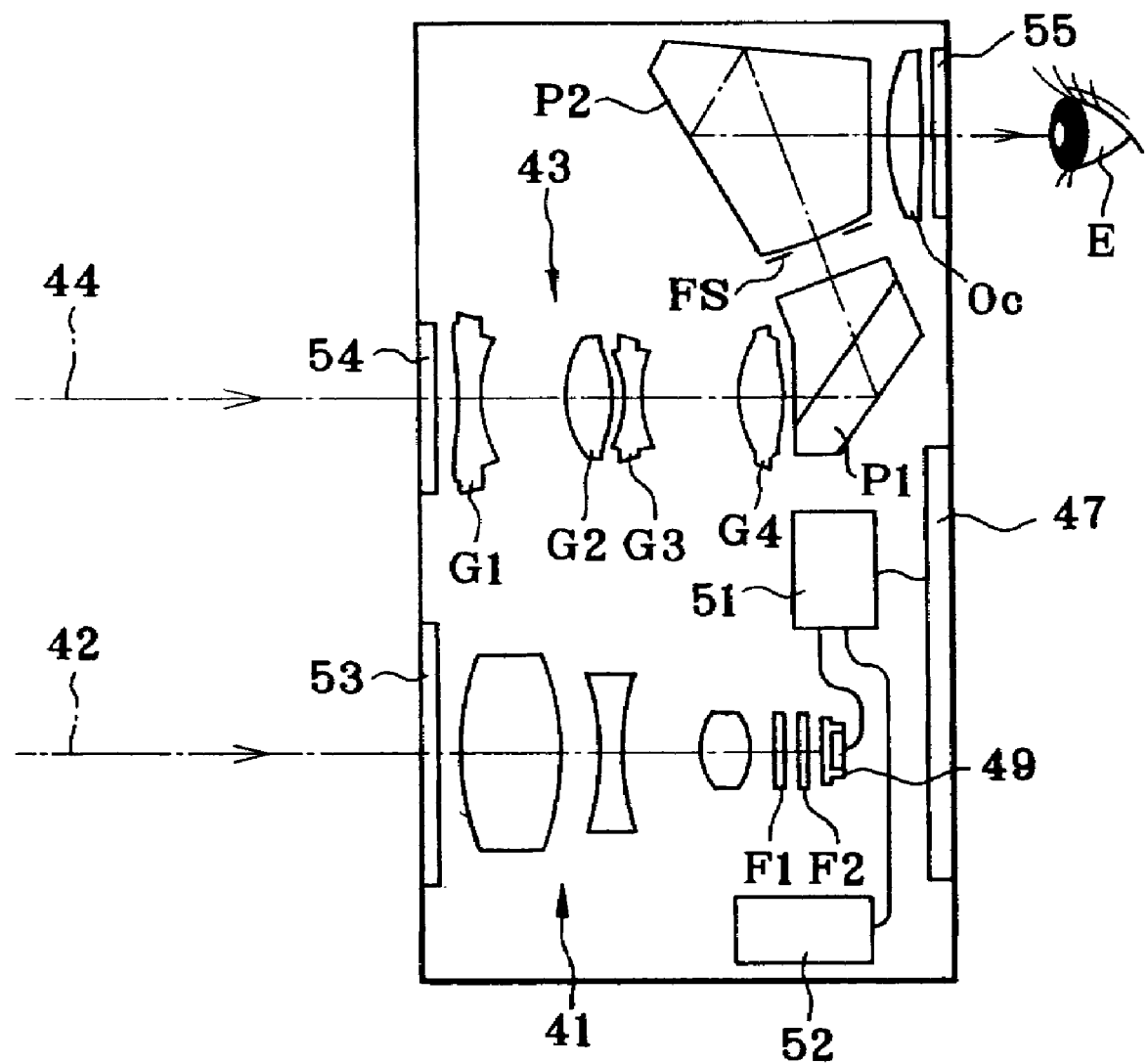
FIG. 8 is a sectional view of the construction of the digital camera of FIG. 6.

FIGS. 6, 7 and 8 are conceptual illustrations of a digital camera that is one typical imaging system incorporating the real image type zoom finder of the invention. FIG. 7 is a front perspective view of the appearance of a digital camera 40, and FIG. 7 is a rear perspective view of the same. FIG. 8 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46 and a liquid crystal monitor 47. As the shutter 45 mounted on the upper portion of the camera 40 is pressed down, phototaking takes place through a zoom lens forming the phototaking optical system 41. The finder optical system 43 on the finder optical path 44 is provided with of the real image type zoom finder of Example 1 for instance, so that a viewer can view an object image by way of the eyepiece optical system Oc in this finder with a viewer's eyeball E. An object image formed by the phototaking optical system 41 is formed on the image pickup plane of an electronic image pickup device CCD 49 via filters F1 and F2 such as low-pass filer and infrared cut filter. The object image received at CCD 49 is displayed as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver salt camera using a silver salt camera in place of CCD 49. It is also noted that cover members 53, 54 and 55 are provided on the entrance sides of the phototaking optical system 41 and finder objective optical system 53 as well as on the exit side of the eyepiece optical system 59.

With the thus constructed digital camera 40, it is possible to achieve high performance as well as size and thickness reductions, because the real image type zoom finder is used as the finder optical system 43. It is noted that if the real image type zoom finder is positioned with its optical path located horizontally with respect to a camera body, it is then possible to diminish the height direction dimension of the camera.

The invention claimed is:

1. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said first lens group consists of one single lens of double-concave shape, which satisfies the following condition:

$$0 < SF1 < 0.65$$

where $SF1=(r_1+r_2)/(r_1-r_2)$ provided that $r_1$ is an axial radius of curvature of an object side-surface of the double-concave lens in the first lens group, and $r_2$ is an axial radius of curvature of an image side-surface of the double-concave lens in the first lens group, wherein a surface located nearest to the object side in said first lens group is an aspheric surface axially concave on an object side thereof, said aspheric surface being configured in such a shape as to decrease in refracting power with distance from an optical axis of the objective optical system.

2. The real image type zoom finder according to claim 1, wherein there is provided the image-erection optical system only on an image side of the zoom finder with respect to said fourth lens group, and said fourth lens group and said image-erection optical system are located with a space therebetween.

3. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from its object side, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein there is provided the image-erection optical system only on an image side of the zoom finder with respect to said fourth lens group, and said fourth lens group and said image-erection optical system are located with a space therebetween, wherein a surface located nearest to the object side in said first lens group is an aspheric surface axially concave on an object side thereof, said aspheric surface being configured in such a shape as to decrease in refracting power with distance from an optical axis of the objective optical system.

4. The real image type zoom finder according to claim 3 or 2, wherein said image-erection optical system comprises a reflecting prism including a planar entrance surface opposite to said fourth lens group side.

5. The real image type zoom finder according to claim 1 or 3, wherein said third lens group consists of a double-concave form of lens component that comes into axial contact with an air separation only at two surfaces, one located nearest to the object side and another located nearest to the image side of the third lens group, and said lens component satisfies the following condition:

$$-0.5 < SF3 < 0.5$$

where $SF3=(r_5+r_6)/(r_5-r_6)$ provided that $r_5$ is an axial radius of curvature of an object side-surface of the double-concave lens component in the third lens group, and $r_6$ is an axial radius of curvature of an image side-surface of the double-concave lens component in the third lens group.

6. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said third lens group consists of a double-concave form of lens component that comes into axial contact with an air separation only at two surfaces, one located nearest to the object side and another located nearest to the image side of the third lens group, and said lens component satisfies the following condition:

$$-0.5 < SF3 < 0.5$$

where $SF3 = (r_5 + r_6)/(r_5 - r_6)$ provided that $r_5$ is an axial radius of curvature of an object side-surface of the double-concave lens component in the third lens group, and $r_6$ is an axial radius of curvature of an image side-surface of the double-concave lens component in the third lens group, wherein a surface located nearest to the object side in said first lens group is an aspheric surface axially concave on an object side thereof, said aspheric surface being configured in such a shape as to decrease in refracting power with distance from an optical axis of the objective optical system.

7. The real image type zoom finder according to any one of claims 1, 3 and 6, wherein said fourth lens group consists of a single lens of positive refracting power.

8. The real image type zoom finder according to any one of claims 1, 3 and 6, wherein said image-erection optical system comprises four or more reflecting surfaces.

9. The real image type zoom finder according to claim 8, wherein said image-erection optical system comprises a prism having a reflecting surface.

10. The real image type zoom finder according to claim 8, wherein at least one reflecting surface of the four or more reflecting surfaces of said image-erection optical system is located on an object side of the zoom finder with respect to said intermediate image-formation plane and at least one reflecting surface is located on an exit pupil side of the zoom finder with respect to said intermediate image-formation plane.

11. The real image type zoom finder according to any one of claims 1, 3 and 6, wherein upon zooming from the wide-angle end to the telephoto end of the zoom finder, said second lens group moves toward the object side alone, and upon zooming from the wide-angle end to the telephoto end of the zoom finder, said third lens group moves toward the image side alone.

12. The real image type zoom finder according to any one of claims 1, 3 and 6, wherein said fourth lens group consists of a single lens that has aspheric surfaces at both object-side and image-side surfaces.

13. The real image type zoom finder according to any one of claims 1, 3 and 6, wherein said fourth lens group consists of a single lens axially convex on both object and image sides thereof, and at least the image side-surface thereof is made up of an aspheric surface that decreases in positive refracting power with distance from an optical axis of said objective optical system.

14. The real image type zoom finder according to any one of claims 1, 3 and 6, wherein said third lens group satisfies the following condition:

$$-1.5 < f_3/f_W < -0.7$$

where $f_3$ is a focal length of the third lens group, and $f_W$ is a composite focal length from an entrance surface of the objective optical system to the intermediate image plane at the wide-angle end.

15. The real image type zoom finder according to any one of claims 1, 3 and 6, wherein said fourth lens group satisfies the following condition:

$$1.0 < f_4/f_W < 1.3$$

where $f_4$ is a focal length of the fourth lens group, and $f_W$ is a composite focal length from an entrance surface of the objective optical system to the intermediate image plane at the wide-angle end.

16. The real image type zoom finder according to any one of claims 1, 3 and 6, wherein said first lens group, said second lens group, said third lens group and said fourth lens group each consist of one single lens.

17. The real image type zoom finder according to any one of claims 1, 3 and 6, wherein each air lens between adjacent lens groups in said first lens group, said second lens group, said third lens group and said fourth lens group takes on a meniscus shape.

18. The real image type zoom finder according to any one of claims 1, 3 and 6, wherein said first lens group satisfies the following condition:

$$-3.0 < f_1/f_W < -1.0$$

where $f_1$ is a focal length of the first lens group, and $f_W$ is a composite focal length from an entrance surface of the objective optical system to the intermediate image plane at the wide-angle end.

19. The real image type zoom finder according to any one of claims 1, 3 and 6, wherein said second lens group satisfies the following condition:

$$1.0 < f_2/f_W < 2.0$$

where $f_2$ is a focal length of the second lens group, and $f_W$ is a composite focal length from an entrance surface of the objective optical system to the intermediate image plane at the wide-angle end.

20. The real image type zoom finder according to any one of claims 1, 3 and 6, wherein said image-erection optical system comprises a first prism that includes a first reflecting surface in said real image type zoom finder, an exit surface in said fourth lens group is positioned just before an entrance surface of said prism, and the entrance surface of said prism is different in shape from the exit surface in said fourth lens group, with satisfaction of the following conditions:

$$1.43 < N_{P1} < 1.8$$

$$0 \leq D4/DG4 < 0.9$$

where D4 is an axial distance from the exit surface in the fourth lens group to the entrance surface of the first prism, DG4 is a real distance from the entrance surface to the exit surface in the fourth lens group, and $N_{P1}$ is a refractive index of a medium of the first prism.

21. The real image type zoom finder according to any one of claims 1, 3 and 6, wherein a finder magnification satisfies the following conditions:

$$0.2 < mw < 0.4$$

$$0.9 < mt < 2.0$$

where mw is a finder magnification at the wide-angle end, and mt is a finder magnification at the telephoto end.

22. The real image type zoom finder according to any one of claims 1, 3 and 6, wherein a field stop is located near said intermediate image plane, and the following conditions are satisfied:

$$28° < \omega_W < 38°$$

$$4° < \omega_T < 12°$$

where $\omega_W$ is a maximum half angle of view at the wide-angle end, and $\omega_T$ is a maximum half angle of view at the telephoto end.

23. The real image type zoom finder according to any one of claims 1, 3 and 6, which satisfies the following conditions:

$$0.20 < D1_W/D_T < 0.40$$

$$0.20 < D3_W/D_T < 0.40$$

$$0.40 < D2_T/D_T < 0.65$$

where $D1_W$ is an air separation between the first lens group and the second lens group at the wide-angle end, $D3_W$ is an air separation between the third lens group and the fourth lens group at the wide-angle end, $D2_T$ is an air separation between the second lens group and the third lens group at the telephoto end, and $D_T$ is a real distance from the entrance surface in the first lens group to the exit surface in the fourth lens group.

24. The real image type zoom finder according to any one of claims 1, 3 and 6, wherein said image-erection optical system comprises two prisms, one being a roof reflecting prism located on an object side of the zoom finder with respect to said intermediate image-formation plane and the other being a penta prism located on a viewer side with respect to said intermediate image-formation plane, wherein said roof reflecting prism is designed such that incident light is reflected at an acute angle, leaving said roof reflecting prism, and said penta prism is designed such that incident light leaves said penta prism substantially parallel with the optical axis of said objective optical system.

25. An imaging system comprising a real image type zoom finder and an imaging optical system having an optical axis different from that of said finder, wherein:

said real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said first lens group consists of one single lens of double-concave shape, which satisfies the following condition:

$$-0 < SF1 < 0.65$$

where $SF1 = (r_1 + r_2)/(r_1 - r_2)$ provided that $r_1$ is an axial radius of curvature of an object side-surface of the double-concave lens in the first lens group, and $r_2$ is an axial radius of curvature of an image side-surface of the double-concave lens in the first lens group; and wherein a surface located nearest to the object side in said first lens group is an aspheric surface axially concave on an object side thereof, said aspheric surface being configured in such a shape as to decrease in refracting power with distance from an optical axis of the objective optical system.

26. An imaging system comprising a real image type zoom finder and an imaging optical system having an optical axis different from that of said finder, wherein:

said real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein the image-erection optical system is located on an image side alone with respect to said fourth lens group, and said fourth lens group and said image-erection optical system are located with a space therebetween; and wherein a surface located nearest to the object side in said first lens group is an aspheric surface axially concave on an object side thereof, said aspheric surface being configured in such a shape as to decrease in refracting power with distance from an optical axis of the objective optical system.

27. An imaging system comprising a real image type zoom finder and an imaging optical system having an optical axis different from that of said finder, wherein:

said real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said third lens group consists of a double-concave form of lens component that comes into axial contact with an air separation only at two surfaces, one located nearest to the object side and another located nearest to the image side of the third lens group, and said lens component satisfies the following condition:

$-0.5 < SF3 < 0.5$ where SF3=$(r_5+r_6)/(r_5-r_6)$ provided that $r_5$ is an axial radius of curvature of an object side-surface of the double-concave lens component in the third lens group, and $r_6$ is an axial radius of curvature of an image side-surface of the double-concave lens component in the third lens group; and
wherein a surface located nearest to the object side in said first lens group is an aspheric surface axially concave on an object side thereof, said aspheric surface being configured in such a shape as to decrease in refracting power with distance from an optical axis of the objective optical system.

28. A real image type zoom finder, comprising, in order from an object side thereof,
an objective optical system for forming an intermediate image-formation plane,
an image-erection optical system for erecting the intermediate image-formation plane formed by said objective optical system, and an eyepiece optical system for viewing said intermediate image-formation plane, wherein:
said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said first lens group consists of one single lens of double-concave shape, which satisfies the following condition:

$0 < SF1 < 0.65$ where SF1=$(r_1+r_2)/(r_1-r_2)$ provided that $r_1$ is an axial radius of curvature of an object side-surface of the double-concave lens in the first lens group, and $r_2$ is an axial radius of curvature of an image side-surface of the double-concave lens in the first lens group, wherein said fourth lens group consists of a single lens that has aspheric surfaces at both object-side and image-side surfaces.

29. A real image type zoom finder, comprising, in order from an object side thereof, an objective optical system for forming an intermediate image-formation plane,
an image-erection optical system for erecting the intermediate image-formation plane formed by said objective optical system, and
an eyepiece optical system for viewing said intermediate image-formation plane, wherein:
said objective optical system comprises, in order from its object side, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein there is provided the image-erection optical system only on an image side of the zoom finder with respect to said fourth lens group, and said fourth lens group and said image-erection optical system are located with a space therebetween, wherein said fourth lens group consists of a single lens that has aspheric surfaces at both object-side and image-side surfaces.

30. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:
said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said third lens group consists of a double-concave form of lens component that comes into axial contact with an air separation only at two surfaces, one located nearest to the object side and another located nearest to the image side of the third lens group, and said lens component satisfies the following condition:

$-0.5 < SF3 < 0.5$ where SF3=$(r_5+r_6)/(r_5-r_6)$ provided that $r_5$ is an axial radius of curvature of an object side-surface of the double-concave lens component in the third lens group, and $r_6$ is an axial radius of curvature of an image side-surface of the double-concave lens component in the third lens group, wherein said fourth lens group consists of a single lens that has aspheric surfaces at both object-side and image-side surfaces.

31. A real image type zoom finder, comprising, in order from an object side thereof,
an objective optical system for forming an intermediate image-formation plane,
an image-erection optical system for erecting the intermediate image-formation plane formed by said objective optical system, and an eyepiece optical system for viewing said intermediate image-formation plane, wherein:
said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said first lens group consists of one single lens of double-concave shape, which satisfies the following condition:

$0 < SF1 < 0.65$ where $SF1=(r_1+r_2)/(r_1-r_2)$ provided that $r_1$ is an axial radius of curvature of an object side-surface of the double-concave lens in the first lens group, and $r_2$ is an axial radius of curvature of an image side-surface of the double-concave lens in the first lens group, wherein said third lens group satisfies the following condition:

$-1.5 < f_3/f_W < -0.7$ where $f_3$ is a focal length of the third lens group, and $f_W$ is a composite focal length from an entrance surface of the objective optical system to the intermediate image plane at the wide-angle end.

32. A real image type zoom finder, comprising, in order from an object side thereof,
   an objective optical system for forming an intermediate image-formation plane,
   an image-erection optical system for erecting the intermediate image-formation plane formed by said objective optical system, and
   an eyepiece optical system for viewing said intermediate image-formation plane, wherein:
   said objective optical system comprises, in order from its object side, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein there is provided the image-erection optical system only on an image side of the zoom finder with respect to said fourth lens group, and said fourth lens group and said image-erection optical system are located with a space therebetween, wherein said third lens group satisfies the following condition:

$-1.5 < f_3/f_W < -0.7$ where $f_3$ is a focal length of the third lens group, and $f_W$ is a composite focal length from an entrance surface of the objective optical system to the intermediate image plane at the wide-angle end.

33. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:
   said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said third lens group consists of a double-concave form of lens component that comes into axial contact with an air separation only at two surfaces, one located nearest to the object side and another located nearest to the image side of the third lens group, and said lens component satisfies the following condition:

$-0.5 < SF3 < 0.5$ where $SF3(r_5+r_6)/(r_5-r_6)$ provided that $r_5$ is an axial radius of curvature of an object side-surface of the double-concave lens component in the third lens group, and $r_6$ is an axial radius of curvature of an image side-surface of the double-concave lens component in the third lens group, wherein said third lens group satisfies the following condition:

$-1.5 < f_3/f_w < -0.7$ where $f_3$ is a focal length of the third lens group, and $f_w$ is a composite focal length from an entrance surface of the objective optical system to the intermediate image plane at the wide-angle end.

34. A real image type zoom finder, comprising, in order from an object side thereof,
   an objective optical system for forming an intermediate image-formation plane,
   an image-erection optical system for erecting the intermediate image-formation plane formed by said objective optical system, and an eyepiece optical system for viewing said intermediate image-formation plane, wherein:
   said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said first lens group consists of one single lens of double-concave shape, which satisfies the following condition:

$0 < SF1 < 0.65$ where $SF1=(r_1+r_2)/(r_1-r_2)$ provided that $r_1$ is an axial radius of curvature of an object side-surface of the double-concave lens in the first lens group, and $r_2$ is an axial radius of curvature of an image side-surface of the double-concave lens in the first lens group, wherein said fourth lens group satisfies the following condition:

$1.0 < f_4/f_W < 1.3$ where $f_4$ is a focal length of the fourth lens group, and $f_W$ is a composite focal length from an entrance surface of the objective optical system to the intermediate image plane at the wide-angle end.

35. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from its object side, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein there is provided the image-erection optical system only on an image side of the zoom finder with respect to said fourth lens group, and said fourth lens group and said image-erection optical system are located with a space therebetween, wherein said fourth lens group satisfies the following condition:

$$1.0 < f_4/f_W < 1.3$$

where $f_4$ is a focal length of the fourth lens group, and $f_W$ is a composite focal length from an entrance surface of the objective optical system to the intermediate image plane at the wide-angle end.

36. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said third lens group consists of a double-concave form of lens component that comes into axial contact with an air separation only at two surfaces, one located nearest to the object side and another located nearest to the image side of the third lens group, and said lens component satisfies the following condition:

$$-0.5 < SF3 < 0.5$$

where $SF3=(r_5+r_6)/(r_5-r_6)$ provided that $r_5$ is an axial radius of curvature of an object side-surface of the double-concave lens component in the third lens group, and $r_6$ is an axial radius of curvature of an image side-surface of the double-concave lens component in the third lens group, wherein said fourth lens group satisfies the following condition:

$$1.0 < f_4/f_W < 1.3$$

where $f_4$ is a focal length of the fourth lens group, and $f_W$ is a composite focal length from an entrance surface of the objective optical system to the intermediate image plane at the wide-angle end.

37. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said first lens group consists of one single lens of double-concave shape, which satisfies the following condition:

$$0 < SF1 < 0.65$$

where $SF1=(r_1+r_2)/(r_1-r_2)$ provided that $r_1$ is an axial radius of curvature of an object side-surface the double-concave lens in the first lens group, and $r_2$ is an axial radius of curvature of an image side-surface of the double-concave lens in the first lens group, wherein said first lens group satisfies the following condition:

$$-3.0 < f_1/f_W < -1.0$$

where $f_1$ is a focal length of the first lens group, and $f_W$ is a composite focal length from an entrance surface of the objective optical system to the intermediate image plane at the wide-angle end.

38. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from its object side, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein there is provided the image-erection optical system only on an image side of the zoom finder with respect to said fourth lens group, and said fourth lens group and said image-erection optical system are located with a space therebetween, wherein said first lens group satisfies the following condition:

$$-3.0 < f_1/f_W < -1.0$$

where $f_1$ is a focal length of the first lens group, and $f_W$ is a composite focal length from an entrance surface of the objective optical system to the intermediate image plane at the wide-angle end.

39. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said third lens group consists of a double-concave form of lens component that comes into axial contact with an air separation only at two surfaces, one located nearest to the object side and another located nearest to the image side of the third lens group, and said lens component satisfies the following condition:

$$-0.5 < SF3 < 0.5$$

where $SF3=(r_5+r_6)/(r_5-r_6)$ provided that $r_5$ is an axial radius of curvature of an object side-surface of the double-concave lens component in the third lens group, and $r_6$ is an axial radius of curvature of an image side-surface of the double-concave lens component in the third lens group, wherein said first lens group satisfies the following condition:

$$-3.0 < f_1/f_W < -1.0$$

where $f_1$ is a focal length of the first lens group, and $f_W$ is a composite focal length from an entrance surface of the objective optical system to the intermediate image plane at the wide-angle end.

40. A real image type zoom finder, comprising, in order from an object side thereof, an objective optical system for forming an intermediate image-formation plane,
an image-erection optical system for erecting the intermediate image-formation plane formed by said objective optical system, and an eyepiece optical system for viewing said intermediate image-formation plane, wherein:
said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said first lens group consists of one single lens of double-concave shape, which satisfies the following condition:

$$0 < SF1 < 0.65$$

where $SF1=(r_1+r_2)/(r_1-r_2)$ provided that $r_1$ is an axial radius of curvature of an object side-surface of the double-concave lens in the first lens group, and $r_2$ is an axial radius of curvature of an image side-surface of the double-concave lens in the first lens group, wherein said second lens group satisfies the following condition:

$$1.0 < f_2/f_W < 2.0$$

where $f_2$ is a focal length of the second lens group, and $f_W$ is a composite focal length from an entrance surface of the objective optical system to the intermediate image plane at the wide-angle end.

41. A real image type zoom finder, comprising, in order from an object side thereof, an objective optical system for forming an intermediate image-formation plane,
an image-erection optical system for erecting the intermediate image-formation plane formed by said objective optical system, and
an eyepiece optical system for viewing said intermediate image-formation plane, wherein:
said objective optical system comprises, in order from its object side, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein there is provided the image-erection optical system only on an image side of the zoom finder with respect to said fourth lens group, and said fourth lens group and said image-erection optical system are located with a space therebetween, wherein said second lens group satisfies the following condition:

$$1.0 < f_2/f_W < 2.0$$

where $f_2$ is a focal length of the second lens group, and $f_W$ is a composite focal length from an entrance surface of the objective optical system to the intermediate image plane at the wide-angle end.

42. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said third lens group consists of a double-concave form of lens component that comes into axial contact with an air separation only at two surfaces, one located nearest to the object side and another located nearest to the image side of the third lens group, and said lens component satisfies the following condition:

$-0.5<SF3<0.5$ where $SF3=(r_5+r_6)/(r_5-r_6)$ provided that $r_5$ is an axial radius of curvature of an object side-surface of the double-concave lens component in the third lens group, and $r_6$ is an axial radius of curvature of an image side-surface of the double-concave lens component in the third lens group, wherein said second lens group satisfies the following condition:

$1.0<f_2/f_W<2.0$ where $f_2$ is a focal length of the second lens group, and $f_W$ is a composite focal length from an entrance surface of the objective optical system to the intermediate image plane at the wide-angle end.

43. A real image type zoom finder, comprising, in order from an object side thereof,
an objective optical system for forming an intermediate image-formation plane,
an image-erection optical system for erecting the intermediate image-formation plane formed by said objective optical system, and an eyepiece optical system for viewing said intermediate image-formation plane, wherein:
said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said first lens group consists of one single lens of double-concave shape, which satisfies the following condition:

$0<SF1<0.65$ where $SF1=(r_1+r_2)/(r1-r_2)$ provided that $r_1$ is an axial radius of curvature of an object side-surface of the double-concave lens in the first lens group, and $r_2$ is an axial radius of curvature of an image side-surface of the double-concave lens in the first lens group, wherein said image-erection optical system comprises a first prism that includes a first reflecting surface in said real image type zoom finder, an exit surface in said fourth lens group is positioned just before an entrance surface of said prism, and the entrance surface of said prism is different in shape from the exit surface in said fourth lens group, with satisfaction of the following conditions:

$1.43<N_{P1}<1.8$ $0 \leq D4/DG4<0.9$ where D4 is an axial distance from the exit surface in the fourth lens group to the entrance surface of the first prism, DG4 is a real distance from the entrance surface to the exit surface in the fourth lens group, and $N_{P1}$ is a refractive index of a medium of the first prism.

44. A real image type zoom finder, comprising, in order from an object side thereof,
an objective optical system for forming an intermediate image-formation plane,
an image-erection optical system for erecting the intermediate image-formation plane formed by said objective optical system, and
an eyepiece optical system for viewing said intermediate image-formation plane, wherein:
said objective optical system comprises, in order from its object side, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein there is provided the image-erection optical system only on an image side of the zoom finder with respect to said fourth lens group, and said fourth lens group and said image-erection optical system are located with a space therebetween, wherein said image-erection optical system comprises a first prism that includes a first reflecting surface in said real image type zoom finder, an exit surface in said fourth lens group is positioned just before an entrance surface of said prism, and the entrance surface of said prism is different in shape from the exit surface in said fourth lens group, with satisfaction of the following conditions:

$1.43<N_{P1}<1.8$ $0 \leq D4/DG4<0.9$ where D4 is an axial distance from the exit surface in the fourth lens group to the entrance surface of the first prism, DG4 is a real distance from the entrance surface to the exit surface in the fourth lens group, and $N_{P1}$ is a refractive index of a medium of the first prism.

45. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:
said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said third lens group consists of a double-concave form of lens component that comes into axial contact with an air separation only at two surfaces, one located nearest to the object side and another located nearest to the image side of the third lens group, and said lens component satisfies the following condition:

$$-0.5 < SF3 < 0.5$$

where $SF3=(r_5+r_6)/(r_5-r_6)$ provided that $r_5$ is an axial radius of curvature of an object side-surface of the double-concave lens component in the third lens group, and $r_6$ is an axial radius of curvature of an image side-surface of the double-concave lens component in the third lens group, wherein said image-erection optical system comprises a first prism that includes a first reflecting surface in said real image type zoom finder, an exit surface in said fourth lens group is positioned just before an entrance surface of said prism, and the entrance surface of said prism is different in shape from the exit surface in said fourth lens group, with satisfaction of the following conditions:

$$1.43 < N_{P1} < 1.8$$

$$0 \leq D4DG4 < 0.9$$

where D4 is an axial distance from the exit surface in the fourth lens group to the entrance surface of the first prism, DG4 is a real distance from the entrance surface to the exit surface in the fourth lens group, and $N_{P1}$ is a refractive index of a medium of the first prism.

46. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said first lens group consists of one single lens of double-concave shape, which satisfies the following condition:

$0 < SF1 < 0.65$ where $SF1=(r_1+r_2)/(r_1-r_2)$ provided that $r_1$ is an axial radius of curvature of an object side-surface of the double-concave lens in the first lens group, and $r_2$ is an axial radius of curvature of an image side-surface of the double-concave lens in the first lens group, wherein a finder magnification satisfies the following conditions:

$$0.2 < mw < 0.4$$

$$0.9 < mt < 2.0$$

where mw is a finder magnification at the wide-angle end, and mt is a finder magnification at the telephoto end.

47. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from its object side, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein there is provided the image-erection optical system only on an image side of the zoom finder with respect to said fourth lens group, and said fourth lens group and said image-erection optical system are located with a space therebetween, wherein a finder magnification satisfies the following conditions:

$$0.2 < mw < 0.4$$

$$0.9 < mt < 2.0$$

where mw is a finder magnification at the wide-angle end, and mt is a finder magnification at the telephoto end.

48. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:

said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said third lens group consists of a double-concave form of lens component that comes into axial contact with an air separation only at two surfaces, one located nearest to the object side and another located nearest to the image side of the third lens group, and said lens component satisfies the following condition:

−0.5<SF3<0.5 where $SF3=(r_5+r_6)/(r_5-r_6)$ provided that $r_5$ is an axial radius of curvature of an object side-surface of the double-concave lens component in the third lens group, and $r_6$ is an axial radius of curvature of an image side-surface of the double-concave lens component in the third lens group, wherein a finder magnification satisfies the following conditions:

0.2<mw<0.4

0.9<mt<2.0 where mw is a finder magnification at the wide-angle end, and mt is a finder magnification at the telephoto end.

49. A real image type zoom finder, comprising, in order from an object side thereof,
an objective optical system for forming an intermediate image-formation plane,
an image-erection optical system for erecting the intermediate image-formation plane formed by said objective optical system, and an eyepiece optical system for viewing said intermediate image-formation plane, wherein:
said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said first lens group consists of one single lens of double-concave shape, which satisfies the following condition:

0<SF1<0.65 where $SF1=(r_1+r_2)/(r_1-r_2)$ provided that $r_1$ is an axial radius of curvature of an object side-surface of the double-concave lens in the first lens group, and $r_2$ is an axial radius of curvature of an image side-surface of the double-concave lens in the first lens group, wherein a field stop is located near said intermediate image plane, and the following conditions are satisfied:

$28°<\omega_W<38°$ $4°<\omega_T<12°$ where $\omega_W$ is a maximum half angle of view at the wide-angle end, and $\omega_T$ is a maximum half angle of view at the telephoto end.

50. A real image type zoom finder, comprising, in order from an object side thereof,
an objective optical system for forming an intermediate image-formation plane,
an image-erection optical system for erecting the intermediate image-formation plane formed by said objective optical system, and
an eyepiece optical system for viewing said intermediate image-formation plane, wherein:
said objective optical system comprises, in order from its object side, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein there is provided the image-erection optical system only on an image side of the zoom finder with respect to said fourth lens group, and said fourth lens group and said image-erection optical system are located with a space therebetween, wherein a field stop is located near said intermediate image plane, and the following conditions are satisfied:

$28°<\omega_W<38°$ $4°<\omega_T<12°$ where $\omega_W$ is a maximum half angle of view at the wide-angle end, and $\omega_T$ 1 is a maximum half angle of view at the telephoto end.

51. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:
said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said third lens group consists of a double-concave form of lens component that comes into axial contact with an air separation only at two surfaces, one located nearest to the object side and another located nearest to the image side of the third lens group, and said lens component satisfies the following condition:

−0.5<SF3<0.5 where $SF3=(r_5+r_6)/(r_5-r_6)$ provided that $r_5$ is an axial radius of curvature of an object side-surface of the double-concave lens component in the third lens group, and $r_6$ is an axial radius of curvature of an image side-surface of the double-concave lens component in the third lens group, wherein a field stop is located near said intermediate image plane, and the following conditions are satisfied:

$28°<\omega_W<38°$ $4°\omega_T<12°$ where $\omega_W$ is a maximum half angle of view at the wide-angle end, and $\omega_T$ is a maximum half angle of view at the telephoto end.

52. A real image type zoom finder, comprising, in order from an object side thereof,
an objective optical system for forming an intermediate image-formation plane,
an image-erection optical system for erecting the intermediate image-formation plane formed by said objective optical system, and an eyepiece optical system for viewing said intermediate image-formation plane, wherein:
said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said first lens group consists of one single lens of double-concave shape, which satisfies the following condition:

$0 < SF1 < 0.65$ where $SF1 = (r_1 + r_2)/(r_1 - r_2)$ provided that $r_1$ is an axial radius of curvature of an object side-surface of the double-concave lens in the first lens group, and $r_2$ is an axial radius of curvature of an image side-surface of the double-concave lens in the first lens group, and wherein said zoom finder satisfies the following conditions:

$0.20 < D1_W/D_T < 0.40$ $0.20 < D3_W/D_T < 0.40$ $0.40 < D2_T/D_T < 0.65$ where $D1_W$ is an air separation between the first lens group and the second lens group at the wide-angle end, $D3_W$ is an air separation between the third lens group and the fourth lens group at the wide-angle end, $D2_T$ is an air separation between the second lens group and the third lens group at the telephoto end, and $D_T$ is a real distance from the entrance surface in the first lens group to the exit surface in the fourth lens group.

53. A real image type zoom finder, comprising, in order from an object side thereof,
an objective optical system for forming an intermediate image-formation plane,
an image-erection optical system for erecting the intermediate image-formation plane formed by said objective optical system, and
an eyepiece optical system for viewing said intermediate image-formation plane, wherein:
said objective optical system comprises, in order from its object side, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein there is provided the image-erection optical system only on an image side of the zoom finder with respect to said fourth lens group, and said fourth lens group and said image-erection optical system are located with a space therebetween, and wherein said zoom finder satisfies the following conditions:

$0.20 < D1_W/D_T < 0.40$ $0.20 < D3_W/D_T < 0.40$ $0.40 < D2_T/D_T < 0.65$ where $D1_W$ is an air separation between the first lens group and the second lens group at the wide-angle end, $D3_W$ is an air separation between the third lens group and the fourth lens group at the wide-angle end, $D2_T$ is an air separation between the second lens group and the third lens group at the telephoto end, and $D_T$ is a real distance from the entrance surface in the first lens group to the exit surface in the fourth lens group.

54. A real image type zoom finder, comprising, in order from an object side thereof, an objective optical system for forming an intermediate image-formation plane, an image-erection optical system for erecting the intermediate image-formation plane formed by said objective optical system, and an eyepiece optical system for viewing said intermediate image-formation plane, wherein:
said objective optical system comprises, in order from an object side thereof, a first lens group of negative refracting power, a second lens group of positive refracting power, a third lens group of negative refracting power and a fourth lens group of positive refracting power, and upon zooming from a wide-angle end to a telephoto end of the zoom finder, said first lens group and said fourth lens group remain fixed, said second lens group moves toward the object side of the zoom finder at the wide-angle end rather than at the telephoto end of the zoom finder, and said third lens group moves toward an image side of the zoom finder at the telephoto end rather than at the wide-angle end, wherein said third lens group consists of a double-concave form of lens component that comes into axial contact with an air separation only at two surfaces, one located nearest to the object side and another located nearest to the image side of the third lens group, and said lens component satisfies the following condition:

$-0.5 < SF3 < 0.5$ where $SF3 = (r_5 + r_6)/(r_5 - r_6)$ provided that $r_5$ is an axial radius of curvature of an object side-surface of the double-concave lens component in the third lens group, and $r_6$ is an axial radius of curvature of an image side-surface of the double-concave lens component in the third lens group, and wherein said zoom finder satisfies the following conditions:

$0.20 < D1_W/D_T < 0.40$ $0.20 < D3_W/D_T < 0.40$ $0.40 < D2_T/D_T < 0.65$ where $D1_W$ is an air separation between the first lens group and the second lens group at the wide-angle end, $D3_W$ is an air separation between the third lens group and the fourth lens group at the wide-angle end, $D2_T$ is an air separation between the second lens group and the third lens group at the telephoto end, and $D_T$ is a real distance from the entrance surface in the first lens group to the exit surface in the fourth lens group.

* * * * *

UNITED STATES PATENT AND TRADEMARK OFFICE
CERTIFICATE OF CORRECTION

PATENT NO. : 7,206,129 B2  
APPLICATION NO. : 10/947486  
DATED : April 17, 2007  
INVENTOR(S) : Takeshi Hosoya Page 1 of 1

It is certified that error appears in the above-identified patent and that said Letters Patent is hereby corrected as shown below:

Column 21, line 55, change "2. The real" to --3. The real--;

Column 21, line 61, change "3. A real" to --2. A real--;

Column 23, line 49, change "1.4<R1b/R2f3.0" to --1.4<R1b/R2f<3.0-- and

Column 25, line 52, change "0.17<D45T/$f_T$0.5" to --0.17<D45T/$f_T$<0.5--.

Signed and Sealed this

Fourth Day of December, 2007

JON W. DUDAS  
*Director of the United States Patent and Trademark Office*